(12) United States Patent
Tomita

(10) Patent No.: US 8,411,134 B2
(45) Date of Patent: Apr. 2, 2013

(54) IMAGE SIGNAL PROCESSING APPARATUS, IMAGE SIGNAL PROCESSING METHOD, AND IMAGE PROJECTION APPARATUS

(75) Inventor: Hideo Tomita, Kanagawa (JP)

(73) Assignee: Sony Corporation, Tokyo (JP)

( * ) Notice: Subject to any disclaimer, the term of this patent is extended or adjusted under 35 U.S.C. 154(b) by 566 days.

(21) Appl. No.: 12/624,576

(22) Filed: Nov. 24, 2009

(65) Prior Publication Data

US 2010/0128107 A1 May 27, 2010

(30) Foreign Application Priority Data

Nov. 25, 2008 (JP) ................ P2008-299262

(51) Int. Cl.
H04N 13/00 (2006.01)
(52) U.S. Cl. .......................... 348/43; 348/42
(58) Field of Classification Search ................ None
See application file for complete search history.

(56) References Cited

U.S. PATENT DOCUMENTS

| | | | | |
|---|---|---|---|---|
| 6,445,833 | B1 * | 9/2002 | Murata et al. | 382/285 |
| 6,924,846 | B2 * | 8/2005 | Ohba et al. | 348/584 |
| 2004/0145655 | A1 * | 7/2004 | Tomita | 348/51 |
| 2005/0225630 | A1 * | 10/2005 | Childers et al. | 348/51 |
| 2007/0195410 | A1 * | 8/2007 | Yun et al. | 359/464 |
| 2008/0018860 | A1 * | 1/2008 | Hennes | 353/7 |

FOREIGN PATENT DOCUMENTS

| | | |
|---|---|---|
| JP | 3-63619 | 3/1991 |
| JP | 9-37277 | 2/1997 |
| JP | 10-210390 | 8/1998 |
| JP | 11-27703 | 1/1999 |
| JP | 2001 285876 | 10/2001 |
| JP | 2002-125245 | 4/2002 |
| JP | 2003-264851 | 9/2003 |
| JP | 2003 348597 | 12/2003 |
| JP | 2005-20314 | 1/2005 |
| JP | 2005-62607 | 3/2005 |
| JP | 2007 271828 | 10/2007 |

OTHER PUBLICATIONS

Office Action corresponding to Chinese Application No. 200910221000.3.

* cited by examiner

Primary Examiner — Mohamed Ibrahim
(74) Attorney, Agent, or Firm — Frommer Lawrence & Haug LLP; William S. Frommer; Ellen Marcie Emas

(57) ABSTRACT

An image signal processing apparatus including a first conversion processing unit performing conversion processing for a left-eye image signal used to display a left-eye image so as to adjust a horizontal and/or vertical size of the left-eye image and correct a vertical bow-like distortion of the left-eye image, a second conversion processing unit performing conversion processing for a right-eye image signal used to display a right-eye image so as to adjust a horizontal and/or vertical size of the right-eye image and correct a vertical bow-like distortion of the right-eye image, and a merging unit obtaining an output image signal by merging a left-eye image signal obtained by performing the conversion processing through the first conversion processing unit and a right-eye image signal obtained by performing the conversion processing through the second conversion processing unit is provided.

10 Claims, 25 Drawing Sheets

10 ha > hb, va = vb ha = hb, va > vb

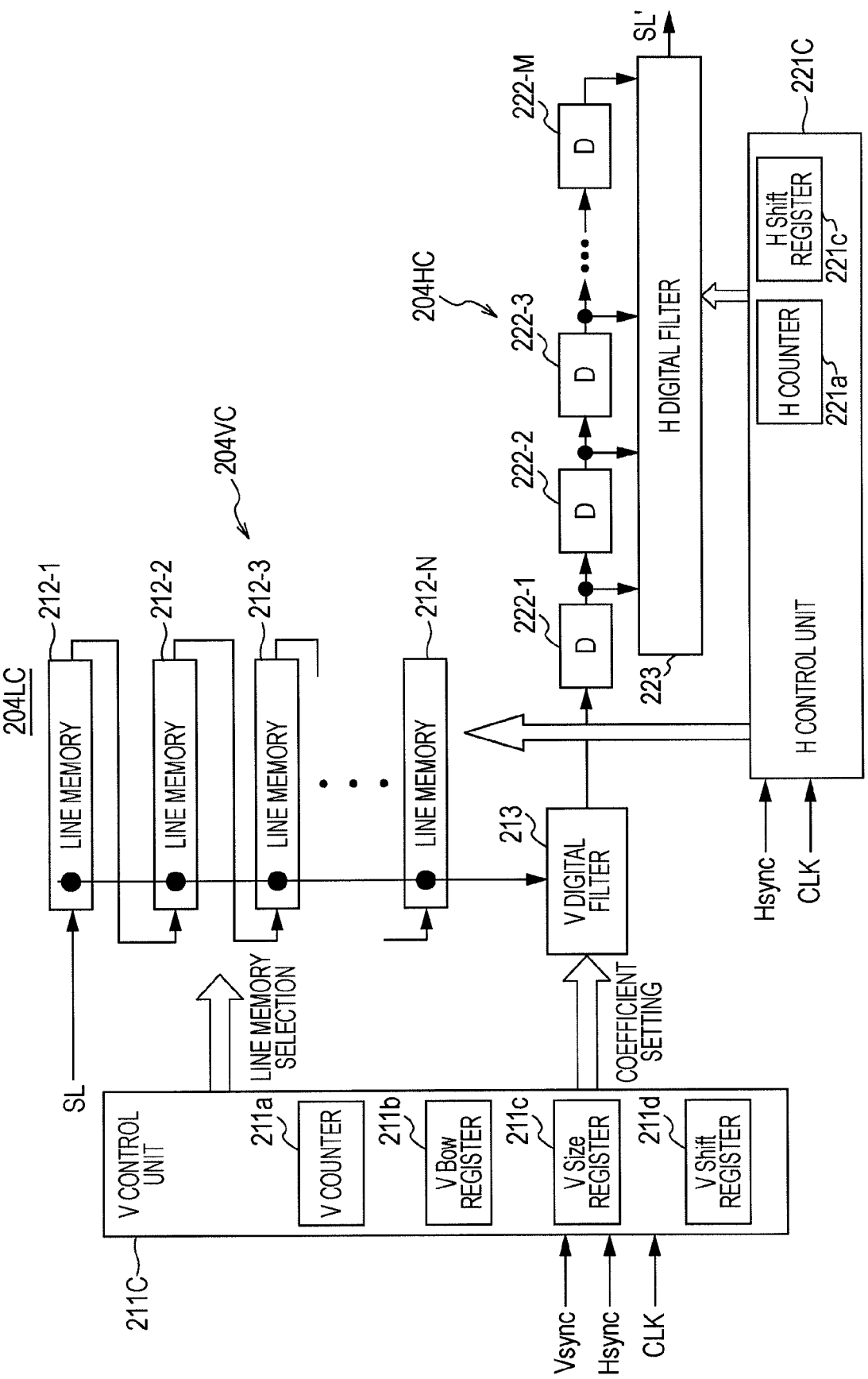

IMAGE SIGNAL PROCESSING APPARATUS, IMAGE SIGNAL PROCESSING METHOD, AND IMAGE PROJECTION APPARATUS

BACKGROUND OF THE INVENTION

1. Field of the Invention

The present invention relates to an image signal processing apparatus, an image signal processing method, and an image projection apparatus, and particularly relates to, for example, an image signal processing apparatus configured to acquire an image signal used to perform stereoscopic image display achieved by arranging a left-eye image and a right-eye image on a display panel in a vertical direction for display.

2. Description of the Related Art

In recent years, the resolutions of liquid crystal panels have been increased so that liquid crystal panels that can handle an image signal with a resolution of about 2048×1080 effective pixels (2 k image signal) have become widely available (see Japanese Unexamined Patent Application Publication No. 2003-348597 and Japanese Unexamined Patent Application Publication No. 2001-285876, for example). Further, liquid crystal panels that can handle an image signal with a resolution of about 4096×2160 effective pixels (4 k image signal) have appeared. Still further, stereoscopic image projection apparatuses configured to display a stereoscopic image by projecting an left-eye image and a right-eye image that are superimposed on each other on a screen by using a single projector have been proposed (see Japanese Unexamined Patent Application Publication No. 2007-271828, for example).

SUMMARY OF THE INVENTION

The screen onto which the left-eye image and the right-eye image are projected as described above includes a curved screen (concave screen) in addition to a flat screen (plane screen). The curved screen is used in many movie theaters. Further, many of projection systems used in the movie theaters are of the downward type. If the curved screen and/or the downward-type projection system is used, for example, the above-described left-eye image and right-eye image that are displayed on the screen do not match with each other on principle so that image displacement occurs.

The present invention has been achieved to correct the displacement between the left-eye image and the right-eye image that are superimposed on each other and projected onto a screen.

An image projection apparatus according to an embodiment of the present invention includes an image display unit configured to align a left-eye image and a right-eye image in a vertical direction on a display panel for display, and a projection optical system configured to project the left-eye image and the right-eye image that are displayed on the display panel onto a screen so that the left-eye image and the right-eye image are superimposed on each other, wherein the image display unit includes a first conversion processing unit configured to perform conversion processing for a left-eye image signal used to display the left-eye image so as to adjust a horizontal and/or vertical size of the left-eye image and correct a vertical bow-like distortion of the left-eye image, a second conversion processing unit configured to perform conversion processing for a right-eye image signal used to display the right-eye image so as to adjust a horizontal and/or vertical size of the right-eye image and correct a vertical bow-like distortion of the right-eye image, and a merging unit configured to obtain an output image signal by merging a left-eye image signal obtained by performing the conversion processing through the first conversion processing unit and a right-eye image signal obtained by performing the conversion processing through the second conversion processing unit.

According to the above-described embodiment of the present invention, the left-eye image and the right-eye image are aligned and displayed in the vertical direction on the display panel of the image display unit. Then, the above-described left-eye image and right-eye image are projected onto the screen through the projection optical system so that the above-described left-eye image and right-eye image are superimposed on each other. For example, the left-eye image is displayed by the first linearly polarized light through a polarization control filter provided for the left-eye image, which is included in the projection optical system, and the right-eye image is displayed by the second linearly polarized light through a polarization control filter provided for the right-eye image, which is included in the projection optical system. Consequently, a viewer can visually recognize a stereoscopic image by viewing the left-eye image and the right-eye image that are superimposed on each other and displayed on the screen through 3D glasses.

The image display unit is provided with the first conversion processing unit, the second conversion processing unit, and the merging unit. The first conversion processing unit performs the conversion processing for the left-eye image signal so as to adjust the horizontal and/or vertical size of the left-eye image and correct the vertical bow-like distortion of the left-eye image. The second conversion processing unit performs the conversion processing for the right-eye image signal so as to adjust the horizontal and/or vertical size of the right-eye image and correct the vertical bow-like distortion of the right-eye image. Then, the merging unit obtains a display image signal (output image signal) by merging the left-eye image signal obtained by performing the conversion processing through the first conversion processing unit and the right-eye image signal obtained by performing the conversion processing through the second conversion processing unit.

For example, each of the first conversion processing unit and the second conversion processing unit includes a vertical conversion unit configured to perform conversion processing so as to correct the vertical bow-like distortion for an input image signal, and a horizontal conversion unit configured to perform conversion processing so as to adjust the horizontal size for an image signal obtained through the vertical conversion unit. Further, each of the first conversion processing unit and the second conversion processing unit includes a vertical conversion unit configured to perform conversion processing so as to adjust the vertical size and correct the vertical bow-like distortion for an input image signal.

If the screen is a curved screen and/or the projection system is of the downward type, for example, when the left-eye image and the right-eye image that are aligned in the vertical direction and displayed on the display panel of the image display unit are superimposed on each other and projected onto the screen through the projection optical system, the left-eye image and the right-eye image that are displayed on the screen do not match with each other on principle so that image displacement occurs.

The components of the above-described displacement occurring between the left-eye image and the right-eye image includes those of (1) displacement occurring due to the difference between aspect ratios and (2) displacement occurring due to the difference between vertical bow-like distortions other than displacements occurring due to a shift toward horizontal and vertical directions. The displacement occurring due to the shifts toward the horizontal and vertical directions can be corrected by shifting lenses, for example.

When the displacement occurring due to the aspect ratios is adjusted through the optical zoom of the projection lens, the displacement occurring due to the difference between horizontal sizes and that occurring due to the difference between vertical sizes are left. Namely, when the vertical sizes of the left-eye image and the right-eye image are equalized through the optical zoom, the displacement occurring due to the difference between the horizontal sizes is left. On the other hand, when the horizontal sizes of the left-eye image and the right-eye image are equalized through the optical zoom, the displacement occurring due to the difference between the vertical sizes is left.

Therefore, the image display unit includes the first and second conversion processing units as described above. Consequently, the displacement occurring between the left-eye image and the right-eye image that are displayed on the screen due to the difference between the horizontal sizes and/or the vertical sizes can be corrected, and the displacement occurring due to the difference between the vertical bow-like distortions can be corrected. Therefore, it becomes possible to correct the displacement occurring between both the left-eye image and the right-eye image, the displacement occurring when the left-eye image and the right-eye image that are displayed on the display panel are superimposed on each other and displayed on the screen through the projection optical system.

According to an embodiment of the present invention, the first conversion processing unit and the second conversion processing unit operate in synchronization with each other, for example. In that case, if one of the first conversion processing unit and the second conversion processing unit performs conversion processing so as to increase a horizontal and/or vertical size of an image, the other of the first conversion processing unit and the second conversion processing unit performs conversion processing so as to decrease the horizontal and/or vertical size of the image. Further, in that case, if one of the first conversion processing unit and the second conversion processing unit performs conversion processing so as to correct one of an upwardly convex vertical bow-like distortion and a downwardly convex vertical bow-like distortion, the other of the first conversion processing unit and the second conversion processing unit performs conversion processing so as to correct the other of the upwardly convex vertical bow-like distortion and the downwardly convex vertical bow-like distortion.

If the first conversion processing unit and the second conversion processing unit operate in synchronization with each other as described above, the displacement occurring due to the difference between the horizontal sizes and/or the vertical sizes of the left-eye image and the right-eye image that are displayed on the screen is corrected by bringing the sizes of both the images. Consequently, the user may not adjust the sizes by separately determining whether the sizes of the left-eye image PL and the right-eye image PR should be increased or decreased, which facilitates the size-adjustment operation. Further, in that case, the displacement occurring due to the difference between the vertical bow-like distortions of the left-eye image and the right-eye image that are displayed on the screen is corrected by reducing the vertical bow-like distortions of both the images PL and PR. Consequently, the user may not correct the vertical bow-like distortions by separately determining which of the upwardly convex vertical bow-like distortion and the downwardly convex vertical bow-like distortion should be corrected for the left-eye image and the right-eye image, which facilitates the vertical-bow-like distortion correction.

Further, according to an embodiment of the present invention, the first conversion processing unit may further perform conversion processing so as to shift the left-eye image in a horizontal direction and a vertical direction, and the second conversion processing unit may further perform conversion processing so as to shift the right-eye image in a horizontal direction and a vertical direction. For example, each of the first conversion processing unit and the second conversion processing unit includes a vertical conversion unit configured to perform conversion processing so as to perform shifting in the vertical direction for an input image signal and a horizontal conversion unit configured to perform conversion processing so as to perform shifting in the horizontal direction for an image signal obtained through the vertical conversion unit.

The displacement occurring due to the horizontal shifting and the vertical shifting can be corrected through the lens shifting, for example. As described above, it is configured that the first and second conversion processing units can perform the conversion processing so as to shift the left-eye image in the horizontal direction and the vertical direction. The above-described configuration is effective when the displacement occurring when the left-eye image and the right-eye image are shifted is so significant that it is difficult to correct the displacement through the lens shifting.

Further, according to an embodiment of the present invention, when the first conversion processing unit and the second conversion processing unit operate in synchronization with each other, and one of the first conversion processing unit and the second conversion processing unit performs conversion processing so as to shift an image in one direction, the other of the first conversion processing unit and the second conversion processing unit may perform conversion processing so as to shift the image in a direction which is a reverse of the one direction. If the first conversion processing unit and the second conversion processing unit operate in synchronization with each other as described above, the displacement occurring between the left-eye image and the right-eye image that are displayed on the screen due to the horizontal shifting and/or the vertical shifting is corrected by bringing the positions of both the images close to each other. Consequently, the user may not perform the shifting by separately determining in which directions the left-eye image and the right-eye image should be shifted, which facilitates the correction operations.

Further, according to an embodiment of the present invention, the projection optical system may include a relay lens configured to form a real image of the left-eye image and a real image of the right-eye image that are separated from each other when light beams that are reflected from the left-eye image and the right-eye image that are displayed on the display panel are made incident, a light guide unit configured to separately guide the formed real image of the left-eye image and the formed real image of the right-eye image, a first projection lens configured to project the guided real image of the left-eye image onto the screen, and a second projection lens configured to project the guided real image of the right-eye image onto the screen. In that case, the projection optical system is configured to separate the real images of the left-eye image and the right-eye image through the relay lens, and guide the real images to the projection lens through the light guide unit. Therefore, it becomes possible to prevent the brightness of the left-eye image and the right-eye image from being decreased, which is effective to increase the image quality.

According to an embodiment of the present invention, an image signal is obtained by merging the left-eye image signal and the right-eye image signal so as to align and display the left-eye image and the right-eye image in a vertical direction on the display panel. Therefore, the first conversion processing unit configured to perform the conversion processing for the left-eye image signal so as to adjust the horizontal and/or vertical size of the image and correct the vertical bow-like distortion of the image and the second conversion processing unit configured to perform the conversion processing for the right-eye image signal so as to adjust the horizontal and/or vertical size of the image and correct the vertical bow-like distortion of the image are provided, which makes it possible to appropriately correct the displacement occurring between the left-eye image and the right-eye image when both the images that are displayed on the display panel are superimposed on each other and displayed on the screen through the projection optical system.

BRIEF DESCRIPTION OF THE DRAWINGS

FIG. 27 is a block diagram showing an exemplary configuration of a resolution conversion unit provided for a left-eye image signal (vertical size adjustment, vertical bow-like distortion correction, and horizontal and/or vertical shifting).

DESCRIPTION OF THE PREFERRED EMBODIMENTS

Hereinafter, the best modes (hereinafter referred to as "embodiments") for achieving the present invention will be described. The descriptions will be given in the following order.

1. Embodiments
2. Exemplary Modifications

1. Embodiments

[Exemplary Configuration of Stereoscopic-Image Projection Apparatus]

Figure 1:
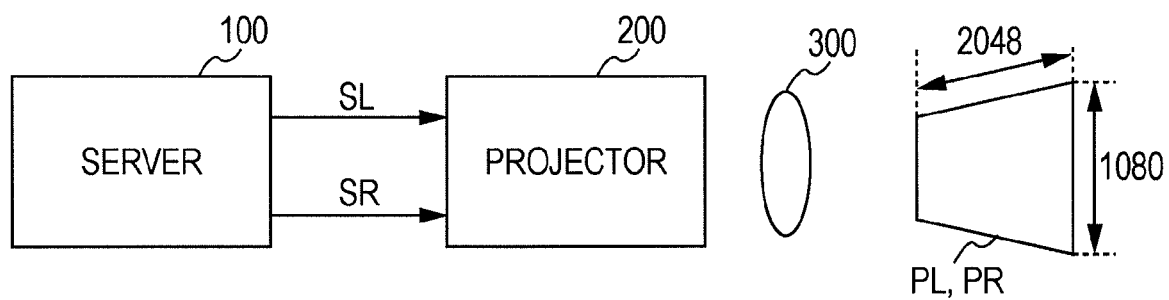
FIG. 1 is a block diagram showing an exemplary configuration of a stereoscopic image projection apparatus according to an embodiment of the present invention.

FIG. 1 shows an exemplary configuration of a stereoscopic-image projection apparatus 10 according to an embodiment of the present invention. The stereoscopic-image projection apparatus 10 includes a server 100, a projector 200, and a 3D-projection optical system 300. The server 100 supplies an image signal to the projector 200. The projector 200 projects an image generated based on the image signal supplied from the server 100 onto a screen via the projection optical system 300. Although not shown in FIG. 1, a liquid crystal panel including approximately 4096×2160 effective pixels (4 k liquid crystal panel) is mounted on the projector 200.

The server 100 externally transmits a left-eye image signal SL and a right-eye image signal SR. Each of the above-described image signals SL and SR is provided to display a 2 k image (a 2048×1080 pixel image). The image signals SL and SR that are transmitted from the server 100 are supplied to the projector 200.

Figure 2:
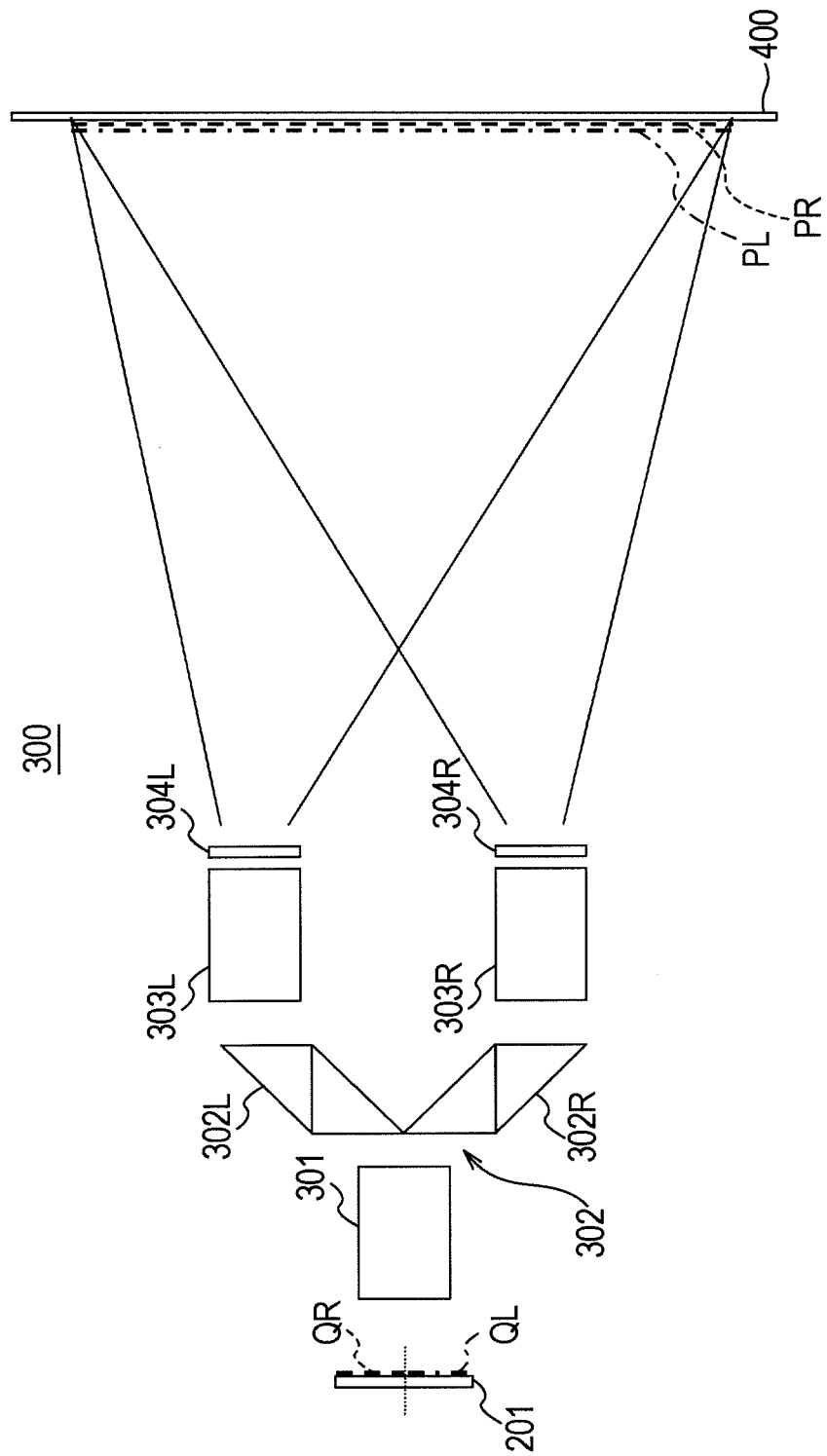
FIG. 2 illustrates how a left-eye image and a right-eye image are projected onto a screen when a stereoscopic image is displayed.
Figure 3:
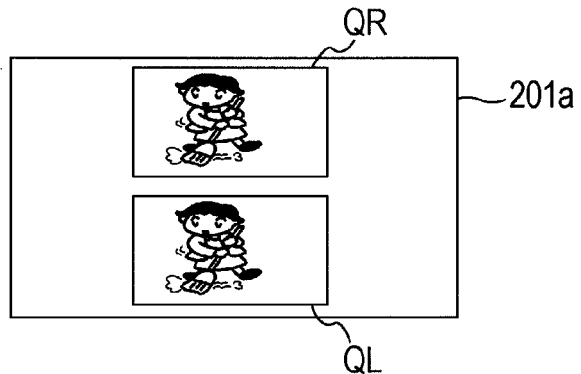
FIG. 3 shows an example where a left-eye image and a right-eye image are shown on a display screen produced on the liquid crystal display of a projector.

FIG. 2 shows how an image is projected onto a screen 400. FIG. 3 exemplarily shows how images are displayed on a display screen 201a of the liquid crystal panel (4k liquid crystal panel) 201. As shown in FIG. 3, a 2 k left-eye image QL and a 2 k right-eye image QR are aligned in a vertical direction and displayed at the same time on part of the display screen 201a. According to FIG. 3, the 2 k right-eye image QR, which is generated based on the right-eye image signal SR, is displayed on an upper center area of the display screen 201a. The 2 k left-eye image QL, which is generated based on the left-eye image signal SL, is displayed on a lower center area of the display screen 201a.

As shown in FIG. 2, the 2 k left-eye image QL and the 2 k right-eye image QR that are displayed on the liquid crystal panel 201 are projected onto the screen 400 through the 3D-projection optical system 300. The 2 k left-eye image PL and the 2 k right-eye image PL are superimposed on each other and displayed on the screen 400.

The 3D-projection optical system 300 will be described. The 3D-projection optical system 300 includes a relay lens 301, a prism block 302, a projection lens 303L provided for a left-eye image, a projection lens 303R provided for a right-eye image, a polarization control filter 304L provided for a left-eye image, and a polarization control filter 304R provided for a right-eye image.

A light beam reflected from each of the left-eye image QL and the right-eye image QR that are displayed on the liquid crystal panel 201 is made incident on the relay lens 301 so that the relay lens 301 forms the real image of each of the left-eye image QL and the right-eye image QR that are separated from each other. The prism block 302 separately guides the formed real images of the left-eye image QL and the right-eye image QR through the relay lens 301. The above-described prism block 302 is included in a light-guide unit, and has a prism block 302L provided for the left-eye image QL and a prism block 302R provided for the right-eye image QR. In that case, the prism blocks 302L and 302R individually guide the real images of the left-eye image QL and the right-eye image QR toward directions away from the emission face of the relay lens 301.

The projection lens 303L provided for the left-eye image QL projects the real image of the left-eye image QL, which is guided by the prism block 302 onto the screen 400 so that the 2 k left-eye image PL is displayed on the screen 400. The above-described projection lens 303L is included in the first projection lens. The projection lens 303R provided for the right-eye image QR projects the real image of the right-eye image QR guided by the prism block 302 onto the screen 400 so that the 2 k right-eye image PR is displayed on the screen 400. The above-described projection lens 303R is included in the second projection lens.

The polarization control filter 304L is provided on the emission side of the projection lens 303L provided for the left-eye image. The above-described polarization control filter 304L converts a circularly polarized light into a first linearly polarized light (one of a vertically polarized light and a horizontally polarized light). The polarization control filter 304R is provided on the emission side of the projection lens 303R provided for the right-eye image. The above-described polarization control filter 304R converts a circularly polarized light into a second linearly polarized light (the other of the vertically polarized light and the horizontally polarized light).

A light beam reflected from the 2 k left-eye image QL displayed on the liquid crystal panel 201 is projected onto the screen 400 via the relay lens 301, the prism block 302L, the projection lens 303L, and the polarization control filter 304L. Accordingly, the 2 k left-eye image PL generated based on the first linearly polarized light is displayed on the screen 400. A light beam reflected from the 2 k right-eye image QR displayed on the liquid crystal panel 201 is projected onto the screen 400 via the relay lens 301, the prism block 302R, the projection lens 303R, and the polarization control filter 304R. Accordingly, the 2 k right-eye image PR generated based on the second linearly polarized light is superimposed on the above-described 2 k left-eye image PL and displayed on the screen 400.

As described above, in the projection optical system 300, the real images of the left-eye image and the right-eye image, which are displayed on the liquid crystal panel 201, are separated from each other through the relay lens 301. After that, the real images are guided to the projection lenses 303L and 303R through the prism block 302. Consequently, it becomes possible to prevent the brightness of the left-eye image PL and the right-eye image PR that are displayed on the screen 400 from being decreased, and increase the image quality.

In the past, for example, configurations provided to divide a light beam emitted from the projection lens into the light beam of a left-eye image and that of a right-eye image through a separation unit have been considered. According to the above-described configurations, however, it has been difficult to clearly divide part of the light beam emitted from the projection lens into the light beam of the left-eye image and that of the right-eye image through the separation unit. In that case, therefore, part of each of the light beams of the left-eye image and the right-eye image is not projected onto a correct position so that the brightness of the left-eye image and the right-eye image that are projected onto a screen is decreased and the image quality is decreased as well.

A viewer can visually recognize a stereoscopic image by viewing the left-eye image PL and the right-eye image PR that are superimposed on each other and displayed on the above-described screen 400 through 3D glasses. The above-described 3D glasses include a left-eye filter and a right-eye filter. The left-eye filter is a polarization filter through which the first linearly polarized light included in the left-eye image PL displayed on the screen 400 passes. The right-eye filter is a polarization filter through which the second linearly polarized light included in the right-eye image PR displayed on the screen 400 passes.

If the screen 400 is a curved screen and/or the projection optical system 300 is of the downward type, for example, when the left-eye image QL and the right-eye image QR that are aligned in the vertical direction and displayed on the liquid crystal panel 201 are superimposed on each other and projected onto the screen 400 through the projection optical system 300 in the above-described manner, the left-eye image PL and the right-eye image PR that are displayed on the screen 400 do not match with each other on principle so that image displacement occurs.

The components of the above-described displacement occurring between the left-eye image PL and the right-eye image PR include (1) displacement occurring due to the difference between aspect ratios and (2) displacement occurring due to the difference between vertical bow-like distortions other than displacement occurring due to horizontal shifting and vertical shifting. The displacement occurring due to the horizontal shifting and the vertical shifting can be corrected by shifting lenses including the projection lenses 303L and 303R, for example.

When the displacement occurring due to the aspect ratios is adjusted through the optical zoom of the projection lenses 303L and 303R, the displacement occurring due to the difference between horizontal sizes and/or that occurring due to the difference between vertical sizes are left as below. Namely, when the vertical sizes of the left-eye image PL and the right-eye image PR are equalized through the optical zoom, the displacement occurring due to the difference between the horizontal sizes is left. On the other hand, when the horizontal sizes of the left-eye image PL and the right-eye image PR are equalized through the optical zoom, the displacement occurring due to the difference between the vertical sizes is left.

Figure 4A:
FIG. 4A shows the component of image displacement which is finally left when the vertical size of the left-eye image and that of the right-eye image are equalized through an optical zoom lens.
Figure 4B:
FIG. 4B also shows the component of the image displacement which is finally left when the vertical size of the left-eye image and that of the right-eye image are equalized through the optical zoom lens.

Each of FIGS. 4A and 4B shows the component of the image displacement which is finally left when the vertical sizes of the left-eye image PL and the right-eye image PR are equalized through the optical zoom. In FIGS. 4A and 4B, an image PA indicates one of the left-eye image PL and the right-eye image PR, and an image PB indicates the other of the left-eye image PL and the right-eye image PR.

In that case, the displacement occurring due to the difference between the horizontal sizes is left, as shown in FIG. 4A. Here, the horizontal size and the vertical size of the image PA are individually indicated by reference characters ha and va, and the horizontal size and the vertical size of the image PB are individually indicated by reference characters hb and vb, where the expressions ha>hb, and va=vb hold. In that case, the displacement occurring due to the difference between the vertical bow-like distortions is left, as shown in FIG. 4B.

Figure 5A:
FIG. 5A shows the component of image displacement which is finally left when the horizontal size of the left-eye image and that of the right-eye image are equalized through an optical zoom lens.
Figure 5B:
FIG. 5B also shows the component of the image displacement which is finally left when the horizontal size of the left-eye image and that of the right-eye image are equalized through the optical zoom lens.

Each of FIGS. 5A and 5B shows the component of the image displacement which is finally left when the horizontal sizes of the left-eye image PL and the right-eye image PR are equalized through the optical zoom. In FIGS. 5A and 5B, an image PA indicates one of the left-eye image PL and the right-eye image PR, and an image PB indicates the other of the left-eye image PL and the right-eye image PR.

In that case, the displacement occurring due to the difference between the vertical sizes is left, as shown in FIG. 5A. Here, the horizontal size and the vertical size of the image PA are individually indicated by reference characters ha and va, and the horizontal size and the vertical size of the image PB are individually indicated by reference characters hb and vb, where the expressions ha=hb, and va>vb hold. In that case, the displacement occurring due to the difference between the vertical bow-like distortions is left, as shown in FIG. 5B.

In the above-described embodiment, the image displacement which is finally left as shown in FIGS. 4A, 4B, 5A, and 5B can be corrected by adjusting the horizontal and/or vertical sizes of the left-eye image QL and the right-eye image QR that are displayed on the liquid crystal panel 201 of the projector 200 and correcting the vertical bow-like distortions occurring in the above-described left-eye image QL and right-eye image QR. Configurations or the like provided to adjust the horizontal sizes and/or the vertical sizes and correct the vertical bow-like distortions will be described later.

[Exemplary Configuration of Projector]

Figure 6:
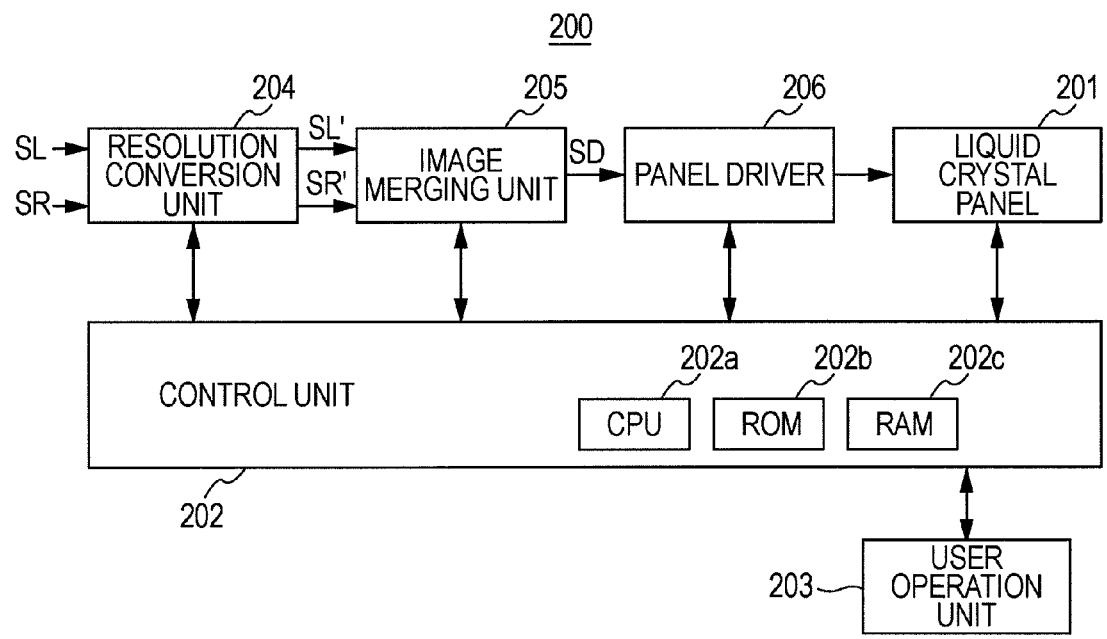
FIG. 6 is a block diagram showing an exemplary configuration of the projector.

Next, an exemplary configuration of the projector 200 will be described with reference to FIG. 6. The projector 200 includes a control unit 202, a user operation unit 203, a resolution conversion unit 204, an image merging unit 205, a panel driver 206, and a liquid crystal panel 201.

The control unit 202 controls operations of each of the units of the projector 200. The control unit 202 includes a central processing unit (CPU) 202a, a read only memory (ROM) 202b, and a random access memory (RAM) 202c. The ROM 202b stores, for example, a program provided to control the CPU 202a. The RAM 202c is used, for example, to temporarily store data used to perform control processing for the CPU 202a. The CPU 202a expands at least one program and/or data read from the ROM 202b on the RAM 202c, starts the program, and controls each of the units of the projector 200.

The user operation unit 203 is included in a user interface and connected to the control unit 202. The user operation unit 203 includes keys and/or buttons that are arranged on a cabinet (not shown) of the projector 200, a remote control unit, and so forth. The user can perform various operations including, for example, correcting the displacement occurring between the left-eye image PL and the right-eye image PR that are displayed on the screen 400 through the above-described user operation unit 203.

The resolution conversion unit 204 performs resolution conversion processing for the left-eye image signal SL and the right-eye image signal SR, as appropriate. Consequently, the number of pixels aligned in vertical and horizontal directions can be adjusted. In that case, an image can be enlarged by increasing the number of pixels. On the other hand, the image can be reduced by decreasing the number of the pixels.

Further, the above-described resolution conversion unit 204 performs conversion processing for the left-eye image signal SL, as appropriate, so as to adjust the horizontal size and/or the vertical size of the left-eye image PL displayed on the screen 400. Further, the resolution conversion unit 204 performs conversion processing so as to correct the vertical bow-like distortion of the left-eye image PL. Further, the resolution conversion unit 204 performs conversion processing for the right-eye image signal SR, as appropriate, so as to adjust the horizontal size and/or the vertical size of the right-eye image PR displayed on the screen 400. Further, the resolution conversion unit 204 performs conversion processing so as to correct the vertical bow-like distortion of the right-eye image PR. The above-described conversion processings performed for the image signals SL and SR are performed based on the user operation when displacement occurs between the left-eye image PL and the right-eye image PR that are displayed on the screen 400 as described above (see FIGS. 4A, 4B, 5A, and 5B). The details of the above-described resolution conversion unit 204 will be described later.

The image merging unit 205 generates a display image signal SD by merging a left-eye image signal SL' and a right-eye image signal SR' that had been processed through the resolution conversion unit 204. The display image signal SD is provided to align and display the left-eye image QL and the right-eye image QR in a vertical direction on the display screen 201a of the liquid crystal panel 201.

The panel driver 206 drives the liquid crystal panel 201 based on the display image signal SD transmitted from the image merging unit 205, and aligns and displays the left-eye image QL and the right-eye image QR on the liquid crystal panel 201.

Operations of the projector 200 shown in FIG. 6 will be described. The left-eye image signal SL and the right-eye image signal SR are supplied to the resolution conversion unit 204. In the resolution conversion unit 204, processing for converting vertical and horizontal resolutions, conversion processing for adjusting a horizontal size and/or a vertical size, and conversion processing for correcting a vertical bow-like distortion are performed for the image signals SL and SR, as appropriate. The processed left-eye image signal SL' and right-eye image signal SR' that are acquired through the above-described resolution conversion unit 204 are supplied to the image merging unit 205.

In the above-described image merging unit 205, the image signals SL' and SR' are merged with each other so that the display image signal SD is generated. The display image signal SD is supplied to the panel driver 206. Therefore, the left-eye image QL and the right-eye image QR are aligned and displayed in a vertical direction on the display screen 201a of the liquid crystal panel 201 based on the display image signal SD (see FIG. 3).

If an instruction to enlarge an image is issued based on the user operation, the resolution conversion unit 204 performs the processing for converting the vertical resolution and the horizontal resolution for the image signals SL and SR, so as to increase the pixel number. Therefore, as each of the images QL and QR that are displayed on the liquid crystal panel 201 increases in size, so does each of the images PL and PR that are displayed on the screen 400.

Further, if an instruction to downsize an image is issued based on the user operation, the resolution conversion unit 204 performs the processing for converting the vertical resolution and the horizontal resolution for the image signals SL and SR, so as to decrease the pixel number. Therefore, as each of the images QL and QR that are displayed on the liquid crystal panel 201 decreases in size, so does each of the images PL and PR that are displayed on the screen 400.

Further, if the resolution conversion unit 204 can perform the conversion processing for adjusting the horizontal size and the conversion processing for correcting the vertical bow-like distortions for the image signals SL and SR, the following operations are performed in the resolution conversion unit 204.

First, an example where an instruction to increase and/or decrease the horizontal size of each of the images PL and PR is issued based on the user operation will be described. In that case, the resolution conversion unit 204 performs conversion processing for each of the image signals SL and SR, so as to increase and/or decrease the horizontal size of each of the images QL and QR that are displayed on the liquid crystal panel 201. Consequently, the horizontal size of each of the images QL and QR that are displayed on the liquid crystal panel 201 is increased and/or decreased so that the horizontal size of each of the images PL and PR that are displayed on the screen 400 is increased and/or decreased.

Figure 7:
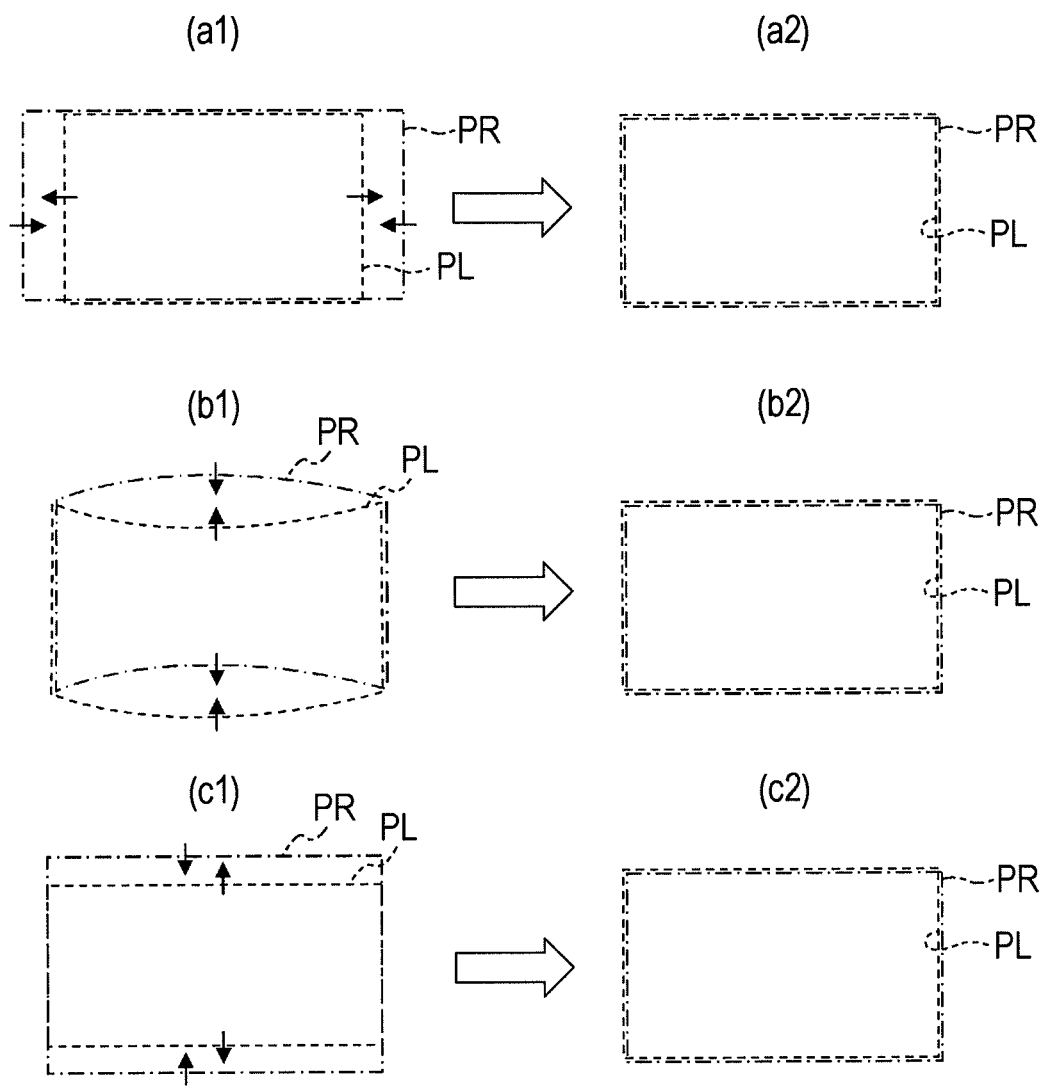
FIG. 7 shows horizontal size adjustment, vertical bow-like distortion correction, and vertical size adjustment that are performed by a resolution conversion unit.

Thus, the horizontal size of each of the images PL and PR that are displayed on the screen 400 can be adjusted based on the user operation. Consequently, if displacement occurs due to the difference between the horizontal sizes of the images PL and PR, the displacement can be eliminated. For example, if displacement occurs due to the difference between the horizontal sizes of the images PL and PR that are displayed on the screen 400, as shown in Part (a1) of FIG. 7, the displacement can be eliminated by adjusting at least one of the horizontal sizes of the images PL and PR, as shown in Part (a2) of FIG. 7. Part (a1) of FIG. 7 shows an example where the horizontal size of the left-eye image PL is smaller than that of the right-eye image PR. On the contrary, however, there may be the case where the horizontal size of the left-eye image PL is larger than that of the right-eye image PR.

In the above-described embodiment, the user can select independent mode and/or interlock mode, as operation mode in which the horizontal size of each of the images PL and PR is adjusted. When the user performs an operation in the independent mode, the resolution conversion unit 204 performs the following conversion processing. Namely, the resolution conversion unit 204 performs conversion processing for the image signal corresponding to only one of the images PL and PR, where the user had issued an instruction to adjust the horizontal size of the only one of the images PL and PR, so that the horizontal size of the only one image is adjusted.

When the user performs an operation in the interlock mode, the resolution conversion unit 204 performs the following conversion processing. Namely, the resolution conversion unit 204 performs the horizontal-size-adjustment conversion processing for each of the image signals SL and SR so that the horizontal-size adjustment is performed for not only the image for which the user had issued the instruction to adjust the horizontal size but also both the images PL and PR. In that case, when the horizontal size of the image for which the user had issued the instruction to adjust the horizontal size is adjusted so that the horizontal size is increased and/or decreased, the horizontal size of the other image is adjusted the other way around so that the horizontal size of the other image is decreased and/or increased.

In the above-described interlock mode, the displacement occurring due to the difference between the horizontal sizes of the images PL and PR that are displayed on the screen 400 is corrected by bringing the horizontal sizes of both the images close to each other. Consequently, the user may not adjust the horizontal sizes by separately determining whether the horizontal sizes of the left-eye image PL and the right-eye image PR should be increased or decreased, which facilitates the horizontal-size-adjustment operation.

Next, an example where an instruction to reduce an upwardly and/or downwardly convex vertical bow-like distortion occurring in the images PL and PR is issued based on the user operation will be described. In that case, the resolution conversion unit 204 performs conversion processing for each of the image signals SL and SR, so as to generate and/or increase the downwardly and/or upwardly convex vertical bow-like distortion in each of the images QL and QR that are displayed on the liquid crystal panel 201. Consequently, the downwardly and/or upwardly convex vertical bow-like distortion is generated and/or increased in each of the images QL and QR that are displayed on the liquid crystal panel 201 so that the upwardly and/or downwardly convex vertical bow-like distortion occurring in each of the images PL and PR that are displayed on the screen 400 is reduced.

Thus, the vertical bow-like distortion occurring in each of the images PL and PR that are displayed on the screen 400 can be corrected based on the user operation. Consequently, if displacement occurs between the images PL and PR due to the difference between the vertical bow-like distortions, the displacement can be eliminated. For example, if displacement occurs between the images PL and PR that are displayed on the screen 400 due to the difference between the vertical bow-like distortions, as shown in Part (b1) of FIG. 7, the displacement can be eliminated by correcting at least one of the vertical bow-like distortions of the images PL and PR, as shown in Part (b2) of FIG. 7. Part (b1) of FIG. 7 shows an example where the upwardly convex vertical bow-like distortion occurs in the left-eye image PL and the downwardly convex vertical bow-like distortion occurs in the right-eye image PR. On the contrary, however, there may be the case where the downwardly convex vertical bow-like distortion occurs in the left-eye image PL and the upwardly convex vertical bow-like distortion occurs in the right-eye image PR.

In the above-described embodiment, the user can select independent mode and/or interlock mode, as operation mode in which the vertical bow-like distortion occurring in each of the images PL and PR is corrected. When the user performs an operation in the independent mode, the resolution conversion unit 204 performs the following conversion processing. Namely, the resolution conversion unit 204 performs conversion processing for an image signal corresponding to only one of the images PL and PR, where the user had issued an instruction to correct the vertical bow-like distortion occurring in the only one of the images PL and PR, so that the vertical bow-like distortion occurring in the only one of the images PL and PR is corrected.

When the user performs an operation in the interlock mode, the resolution conversion unit 204 performs the following conversion processing. Namely, the resolution conversion unit 204 performs the vertical-bow-like-distortion correction processing for each of the image signals SL and SR so that the vertical-bow-like-distortion correction is performed for not only the image for which the user had issued the instruction to correct the vertical bow-like distortion but also both the images PL and PR. In that case, when the upwardly and/or downwardly convex vertical bow-like distortion is corrected in the image for which the user had issued the instruction to make the correction, the downwardly and/or upwardly convex vertical bow-like distortion is corrected in the other image.

In the above-described interlock mode, the displacement occurring due to the difference between the vertical bow-like distortions of the images PL and PR that are displayed on the screen 400 is corrected by reducing the vertical bow-like distortions of both the images PL and PR. Consequently, the user may not correct the vertical bow-like distortions by separately determining which of the upwardly convex vertical bow-like distortion and the downwardly convex vertical bow-like distortion should be corrected for the left-eye image PL and the right-eye image PR, which facilitates the vertical-bow-like distortion correction.

When the resolution conversion unit 204 can perform the conversion processing for adjusting the horizontal size and the conversion processing for correcting the vertical bow-like distortion in the above-described manner, the displacements occurring due to the difference between the horizontal sizes and that between the vertical bow-like distortions can be corrected. Therefore, if the displacements occurring due to the difference between the horizontal sizes and that between the vertical bow-like distortions are finally left when the vertical sizes of the images PA and PB are equalized through the optical zoom, as shown in FIGS. 4A and 4B that are described above, the displacements can be appropriately corrected.

Further, when the resolution conversion unit 204 can perform the conversion processing for adjusting the vertical size and the conversion processing for correcting the vertical bow-like distortion for the image signals SL and SR, the resolution conversion unit 204 performs the following operations.

First, an example where an instruction to increase and/or decrease the vertical size of each of the images PL and PR is issued based on the user operation will be described. In that case, the resolution conversion unit 204 performs conversion processing for each of the image signals SL and SR, so as to increase and/or decrease the vertical size of each of the images QL and QR that are displayed on the liquid crystal panel 201. Therefore, the vertical size of each of the images PL and PR that are displayed on the liquid crystal panel 201 is increased and/or decreased so that the vertical size of each of the images PL and PR that are displayed on the screen 400 is increased and/or decreased.

Thus, the vertical size of each of the images PL and PR that are displayed on the screen 400 can be adjusted based on the user operation. Consequently, if displacement occurs due to the difference between the vertical sizes of the images PL and PR, the displacement can be eliminated. For example, if displacement occurs due to the difference between the vertical sizes of the images PL and PR that are displayed on the screen 400, as shown in Part (c1) of FIG. 7, the displacement can be eliminated by adjusting at least one of the vertical sizes of the images PL and PR, as shown in Part (c2) of FIG. 7. Part (c1) of FIG. 7 shows an example where the vertical size of the left-eye image PL is smaller than that of the right-eye image PR. On the contrary, however, there may be the case where the vertical size of the left-eye image PL is larger than that of the right-eye image PR.

In the above-described embodiment, the user can select independent mode and/or interlock mode, as operation mode in which the vertical size of each of the images PL and PR is adjusted. When the user performs an operation in the independent mode, the resolution conversion unit 204 performs the following conversion processing. Namely, the resolution conversion unit 204 performs conversion processing for an image signal corresponding to only one of the images PL and PR, where the user had issued an instruction to adjust the vertical size of the only one of the images PL and PR, so that the vertical size of the only one image is adjusted.

When the user performs an operation in the interlock mode, the resolution conversion unit 204 performs the following conversion processing. Namely, the resolution conversion unit 204 performs the vertical-size-adjustment conversion processing for each of the image signals SL and SR so that the vertical-size adjustment is performed for not only the image for which the user had issued the instruction to adjust the vertical size but also both the images PL and PR. In that case, when the vertical size of the image for which the user had issued the instruction to adjust the vertical size is adjusted so that the vertical size is increased and/or decreased, the vertical size of the other image is adjusted the other way around so that the vertical size of the other image is decreased and/or increased.

In the above-described interlock mode, the displacement occurring due to the difference between the vertical sizes of the images PL and PR that are displayed on the screen 400 is corrected by bringing the vertical sizes of both the images close to each other. Consequently, the user may not adjust the vertical sizes by separately determining whether the vertical sizes of the images PL and PR should be increased or decreased, which facilitates the vertical-size-adjustment operation.

Next, an example where an instruction to reduce an upwardly and/or downwardly convex vertical bow-like distortion occurring in each of the images PL and PR is issued based on the user operation will be described. In that case, the resolution conversion unit 204 performs conversion processing for each of the image signals SL and SR, so as to generate and/or increase the downwardly and/or upwardly convex vertical bow-like distortion in each of the images QL and QR that are displayed on the liquid crystal panel 201. Consequently, the downwardly and/or upwardly convex vertical bow-like distortion is generated and/or increased in each of the images QL and QR that are displayed on the liquid crystal panel 201 so that the upwardly and/or downwardly convex vertical bow-like distortion occurring in each of the images PL and PR that are displayed on the screen 400 is reduced.

Since other operations relating to the above-described vertical-bow-like-distortion correction are equivalent to the operations performed when the above-described resolution conversion unit 204 can perform the conversion processing for the horizontal-size adjustment and the conversion processing for the vertical-bow-like-distortion correction, the descriptions thereof will be omitted.

When the resolution conversion unit 204 can perform the conversion processing for adjusting the vertical size and the conversion processing for correcting the vertical bow-like distortion in the above-described manner, the displacements occurring due to the difference between the vertical sizes and that between the vertical bow-like distortions in the images PL and PR can be corrected. Therefore, if the displacements occurring due to the difference between the vertical sizes and that between the vertical bow-like distortions are finally left when the horizontal sizes of the images PA and PB are equalized through the optical zoom, as shown in FIGS. 5A and 5B that are described above, the displacements can be appropriately corrected.

[Exemplary Configuration of Resolution Conversion Unit]

Next, an exemplary configuration of the resolution conversion unit 204 will be described. The resolution conversion unit 204 includes a resolution conversion unit provided for the left-eye image signal SL and a resolution conversion unit provided for the right-eye image signal SR. The configurations of the above-described resolution conversion units are equivalent to each other. Hereinafter, therefore, only the resolution conversion unit provided for the left-eye image signal SL will be described and the description of the resolution conversion unit provided for the right-eye image signal SR will be omitted.

Figure 8:
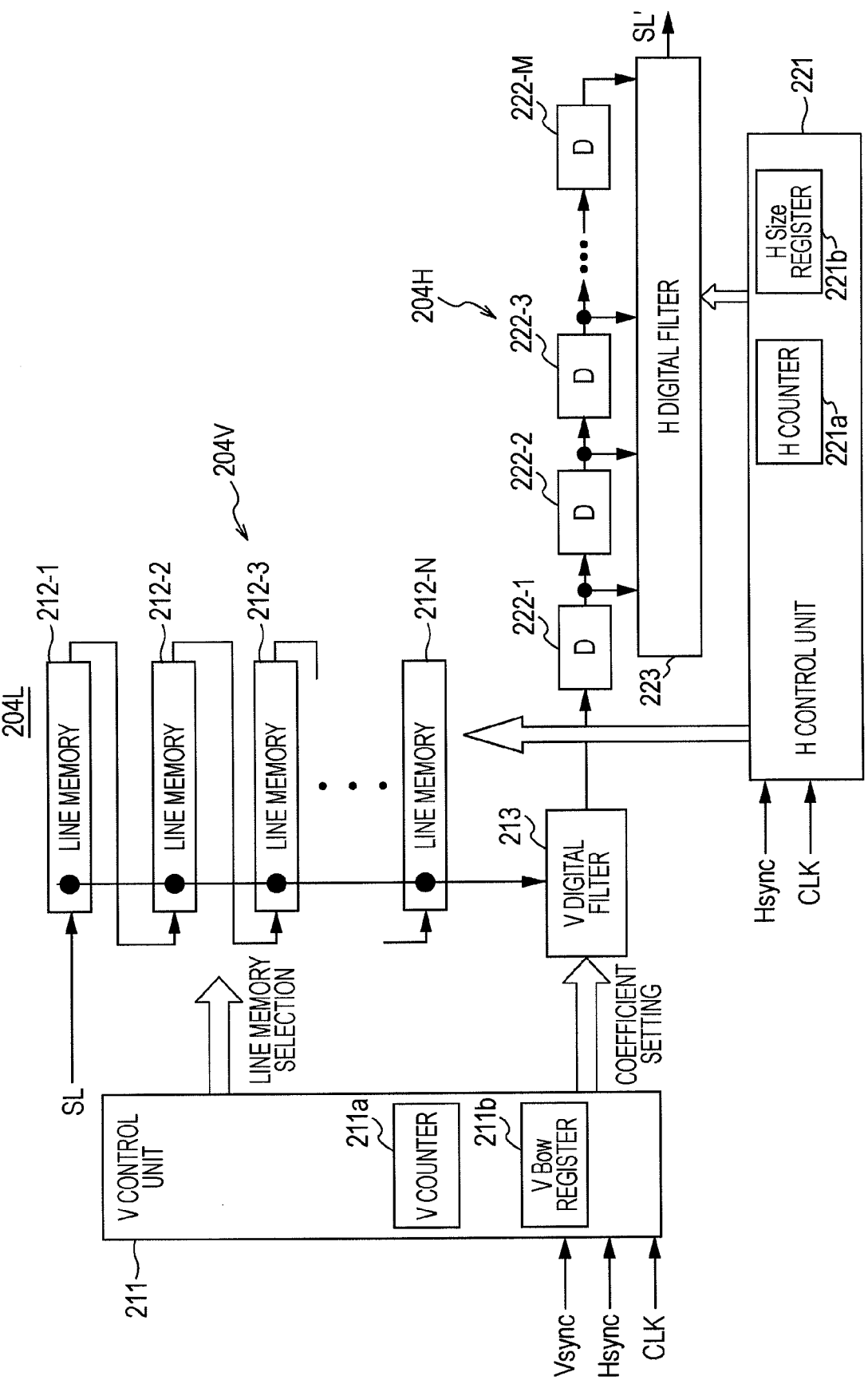
FIG. 8 is a block diagram showing an exemplary configuration of a resolution conversion unit (horizontal size adjustment and vertical bow-like distortion correction) provided for a left-eye image signal.

FIG. 8 shows a resolution conversion unit 204L provided for the left-eye image signal SL, where the resolution conversion unit 204L can perform the conversion processing for the horizontal size adjustment and the conversion processing for the vertical-bow-like distortion correction. The above-described resolution conversion unit 204L includes a vertical conversion unit 204V and a horizontal conversion unit 204H.

With regard to the resolution conversion, the vertical conversion unit 204V performs vertical resolution conversion processing so as to adjust the number of pixels provided in a vertical direction, and the horizontal conversion unit 204H performs horizontal resolution conversion processing so as to adjust the number of pixels provided in a horizontal direction. Further, with regard to the horizontal size adjustment, the horizontal conversion unit 204H performs conversion processing so as to adjust a horizontal size. With regard to the vertical-bow-like-distortion correction, the vertical conversion unit 204V performs conversion processing so as to correct a vertical bow-like distortion.

The vertical conversion unit 204V includes a V control unit 211, a plurality of line memories 212-1 to 212-N, and a V digital filter 213. The line memories 212-1 to 212-N are connected in series. Image signals of the lines, which are included in the left-eye image signal SL transmitted to the line memory 212-1, are orderly forwarded to the subsequent line memory in accordance with the progress of the processing.

The V control unit 211 includes a V counter 211a and a V bow register 211b. The V counter 211a is reset by a vertical synchronization signal Vsync and is incremented by a horizontal synchronization signal Hsync. The V bow register 211b stores data of a correction value added to the count value of the V counter 211a for each pixel clock signal CLK when the conversion processing for the vertical-bow-like-distortion correction is performed.

The V control unit 211 selects a plurality of line memories from which pixel signals should be read from among the line memories 212-1 to 212-N based on the count value of the V counter 211a. Further, the V control unit 211 sets a coefficient (weight coefficient) by which each of the pixel signals read from the selected line memories should be multiplied to the V digital filter 213.

The V digital filter 213 multiplies the pixel signal read from each of the selected line memories by the set coefficient and totals the pixel signals, and externally transmits a pixel signal obtained through the above-described processing. The setting of read addresses of the selected line memories is made by the horizontal conversion unit 204H, as described later.

Further, the horizontal conversion unit 204H includes an H control unit 221, a plurality of pixel delay circuits 222-1 to 222-M, and an H digital filter 223. The pixel delay circuits 222-1 to 222-M are connected in series. Each of pixel signals transmitted from the V digital filter 213 to the pixel delay circuit 222-1 is orderly forwarded to the subsequent pixel delay circuit in accordance with the progress of the processing.

The H control unit 221 includes an H counter 221a and an H size register 221b. The H counter 221a is reset by a horizontal synchronization signal Hsync and incremented by a pixel clock signal CLK. The H size register 221b stores data of a correction value which should be added to the count value of the H counter 221a for each pixel clock signal CLK when the conversion processing for the horizontal size adjustment is performed.

The H control unit 221 sets the read addresses of the line memories selected by the V control unit 211 in the vertical conversion unit 204V as described above based on the count value of the H counter 221a. Further, the H control unit 221 sets a coefficient (weight coefficient) by which each of the pixel signals transmitted from the pixel delay circuits 222-1 to 222-M should be multiplied to the H digital filter 223.

The H digital filter 223 multiplies each of the pixel signals read from the pixel delay circuits 222-1 to 222-M by the set coefficient and totals the pixel signals, and externally transmits a pixel signal obtained through the above-described processing. The above-described signal externally transmitted from the H digital filter 223 becomes the processed left-eye image signal SL'.

Next, operations of the resolution conversion unit 204L shown in FIG. 8 will be described. First, the operations of vertical resolution conversion processing performed by the vertical conversion unit 204V will be described with reference to FIGS. 9 and 10.

When the resolution conversion unit 204L performs the vertical resolution conversion processing, a pixel signal is generated in a line provided at the vertical position corresponding to the count value of the V counter 211a within each line period. As described above, the V counter 211a is incremented for each horizontal synchronization signal Hsync. Therefore, when the increment value is 1, the number of pixels provided in the vertical direction becomes the same as that corresponding to the transmitted left-eye image signal SL so that the image is neither enlarged nor reduced in the vertical direction.

Figure 9:
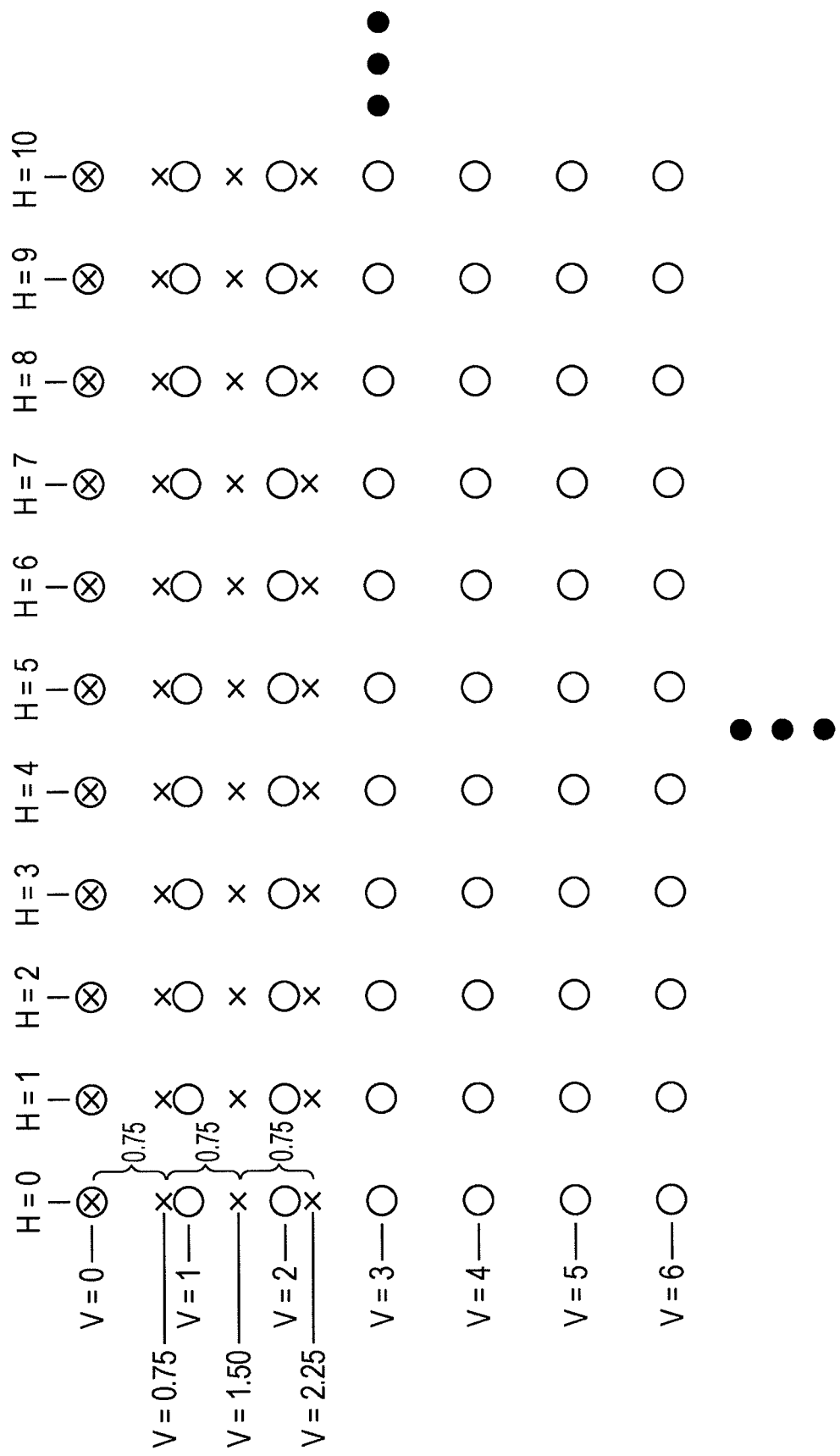
FIG. 9 illustrates the operations of vertical resolution conversion processing (increasing the pixel number and enlarging an image) performed by a vertical conversion unit of the resolution conversion unit.
Figure 10:
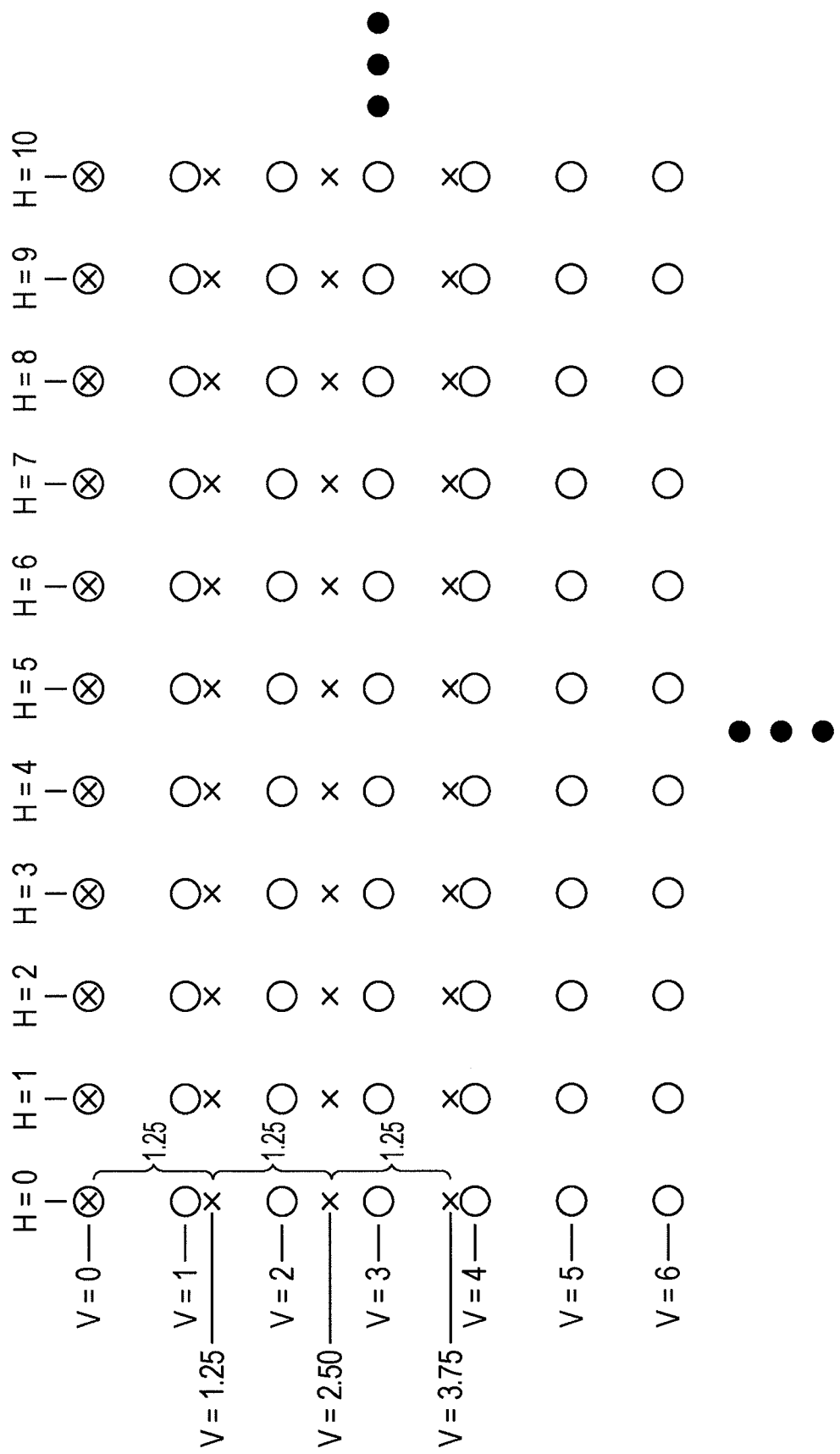
FIG. 10 illustrates the operations of vertical resolution conversion processing (decreasing the pixel number and reducing an image) performed by the vertical conversion unit of the resolution conversion unit.

In each of FIGS. 9 and 10, the sign "○" denotes the pixel position corresponding to each of pixel signals that are included in the left-eye image signal SL. If the increment value of the V counter 211a is 1, the count value is changed from 0 to 1, 2, 3, and so forth. Therefore, according to the vertical resolution conversion processing, a pixel signal is generated at the pixel position indicated by the sign "○". In that case, the number of the pixels provided in the vertical direction is not changed and the image is neither compressed nor enlarged in the vertical direction.

Further, when the increment value of the V counter 211a is smaller than 1, the number of the pixels provided in the vertical direction becomes larger than that corresponding to the transmitted left-eye image signal SL, and the image is enlarged in the vertical direction. In FIG. 9, the sign "x" denotes the pixel position of a pixel signal generated when the increment value of the V counter 211a is 0.75. In that case, the count value of the V counter 211a is changed from 0 to 0.75, 1.50, 2.25, and so forth, and a pixel signal is generated in a line provided at the vertical position corresponding to the above-described count value. Since the number of pixels provided in the vertical direction is increased by a factor of 1/0.75=1.33, the image is multiplied by a factor of 1.33 in the vertical direction.

Further, when the increment value of the V counter 211a is larger than 1, the number of the pixels provided in the vertical direction becomes smaller than that corresponding to the transmitted left-eye image signal SL, and the image is reduced in the vertical direction. In FIG. 10, the sign "x" denotes the pixel position of a pixel signal generated when the increment value of the V counter 211a is 1.25. In that case, the count value of the V counter 211a is changed from 0 to 1.25, 2.50, 3.75, and so forth, and a pixel signal is generated in a line provided at the vertical position corresponding to the above-described count value. Since the number of pixels provided in the vertical direction is decreased by a factor of 1/1.25=0.8, the image is reduced by a factor of 0.8 in the vertical direction.

Next, the operations of horizontal resolution conversion processing performed by the horizontal conversion unit 204H will be described with reference to FIGS. 11 and 12.

When the resolution conversion unit 204H performs the horizontal resolution conversion processing, a pixel signal is generated in a line provided at the horizontal position corresponding to the count value of the H counter 221a for each pixel clock signal CLK. As described above, the H counter 221a is incremented for each pixel clock signal CLK. Therefore, when the increment value is 1, the number of pixels provided in the horizontal direction becomes the same as that corresponding to the transmitted left-eye image signal SL so that the image is neither enlarged nor reduced in the horizontal direction.

Figure 11:
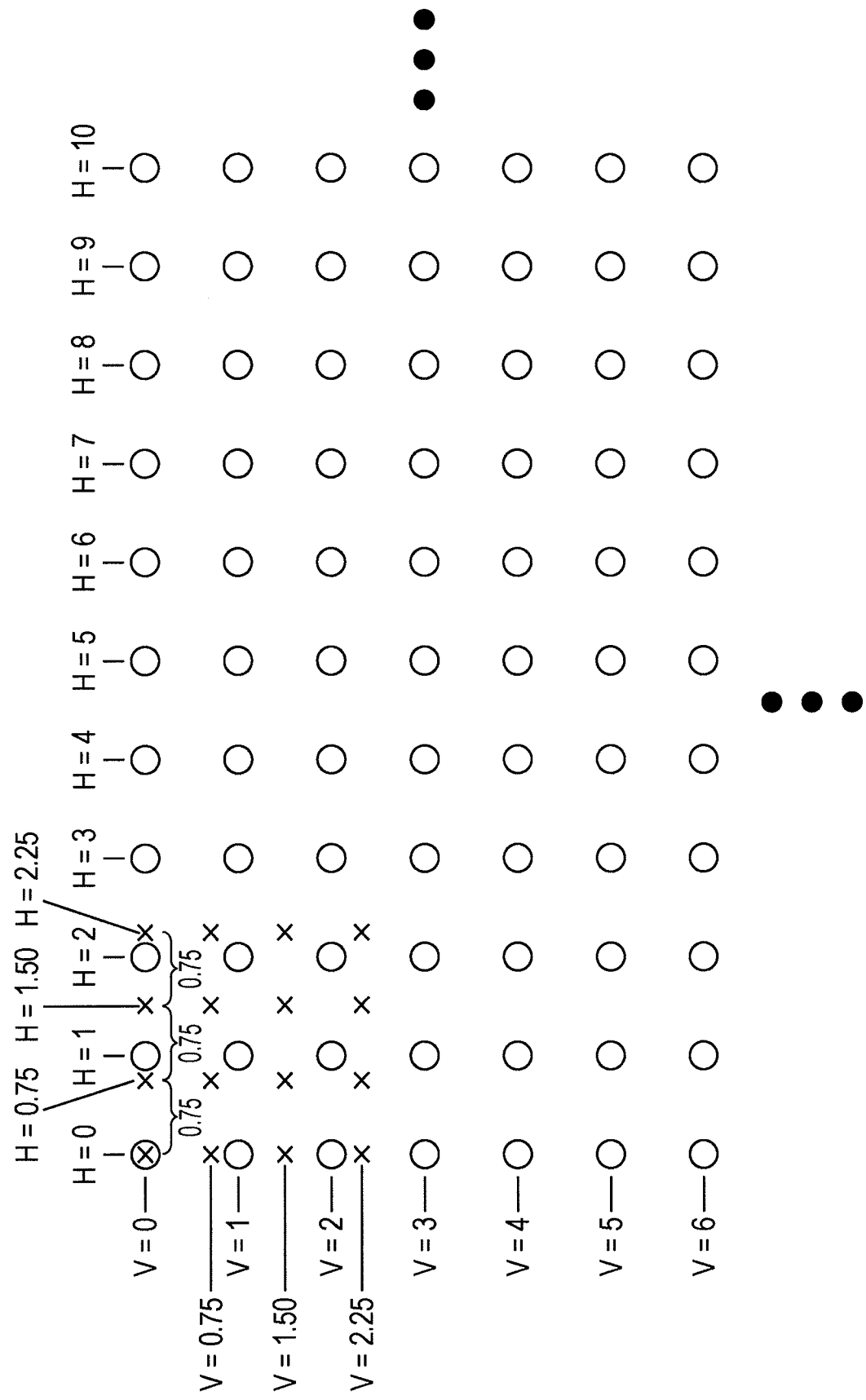
FIG. 11 illustrates the operations of horizontal resolution conversion processing (increasing the pixel number and enlarging an image) performed by a horizontal conversion unit of the resolution conversion unit.
Figure 12:
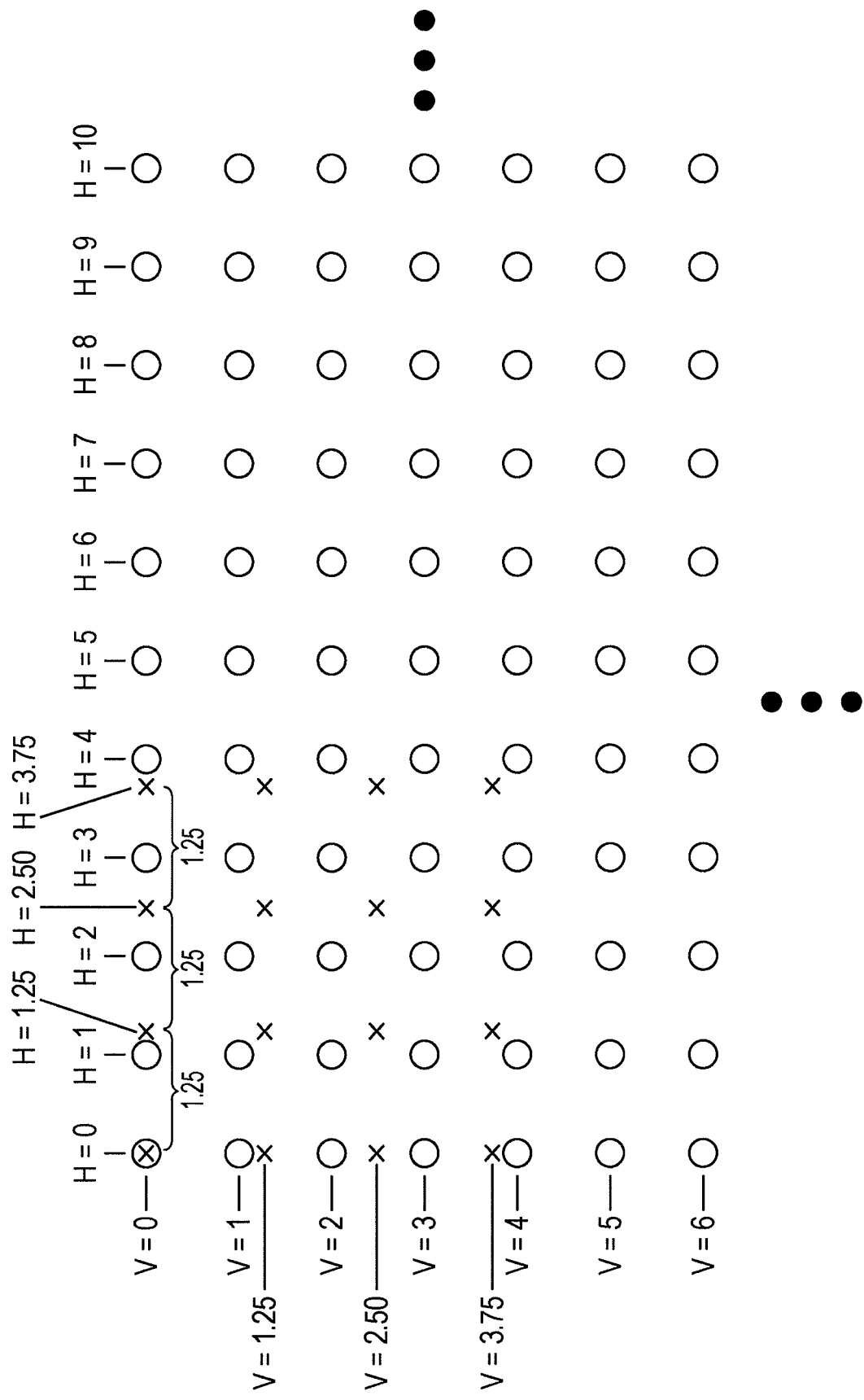
FIG. 12 illustrates the operations of horizontal resolution conversion processing (decreasing the pixel number and reducing an image) performed by the horizontal conversion unit of the resolution conversion unit.

In each of FIGS. 11 and 12, the sign "○" denotes the pixel position corresponding to each of pixel signals that are included in the left-eye image signal SL. If the increment value of the H counter 221a is 1, the count value is changed from 0 to 1, 2, 3, and so forth. Therefore, according to the horizontal resolution conversion processing, a pixel signal is generated at the pixel position indicated by the sign "○". In that case, the number of the pixels provided in the horizontal direction is not changed and the image is neither compressed nor enlarged in the horizontal direction.

Further, when the increment value of the H counter 221a is smaller than 1, the number of the pixels provided in the horizontal direction becomes larger than that corresponding to the transmitted left-eye image signal SL, and the image is enlarged in the horizontal direction. In FIG. 11, the sign "x" denotes the pixel position of a pixel signal generated when the increment value of the V counter 211a is 0.75, and the increment value of the H counter 221a is 0.75. In that case, the count value of the H counter 221a is changed from 0 to 0.75, 1.50, 2.25, and so forth, and a pixel signal is generated at the horizontal position corresponding to the above-described count value. Since the number of pixels provided in the horizontal direction is increased by a factor of 1/0.75=1.33, the image is multiplied by a factor of 1.33 in the horizontal direction.

Further, when the increment value of the H counter 221a is larger than 1, the number of pixels provided in the horizontal direction becomes smaller than that corresponding to the transmitted left-eye image signal SL, and the image is reduced in the horizontal direction. In FIG. 12, the sign "x" denotes the pixel position of a pixel signal generated when the increment value of the V counter 211a of the V control unit 211 is 1.25 and that of the increment value of the H counter 221a is 1.25. In that case, the count value of the H counter 221a is changed from 0 to 1.25, 2.50, 3.75, and so forth, and a pixel signal is generated at the horizontal position corresponding to the above-described count value. Since the number of pixels provided in the horizontal direction is decreased by a factor of 1/1.25=0.8, the image is reduced by a factor of 0.8 in the horizontal direction.

When being instructed to enlarge and/or reduce the left-eye image QL (left-eye image PL) based on the user operation, the increment value of each of the V counter 211a and the H counter 221a is set based on an enlargement ratio and a reduction ratio. Therefore, the resolution conversion processing is performed in each of the vertical conversion unit 204V and the horizontal conversion unit 204H based on the enlargement ratio and/or the reduction ratio, and the image is enlarged and/or reduced as described above. Here, it may be configured that the ratio of enlargement and/or reduction in each of the vertical direction and the horizontal direction can be independently set. In that case, the increment value of the V counter 211a is different from that of the H counter 221a.

Next, the horizontal size adjustment processing performed through the horizontal conversion unit 204H will be described with reference to FIGS. 13 and 14. As described above, the H size register 221b stores the data of the correction value which should be added to the count value of the H counter 221a for each pixel clock signal CLK when the conversion processing for the horizontal size adjustment is performed. The above-described correction value is determined based on the amount of a change in the horizontal size (an enlargement amount and a reduction amount).

When the horizontal conversion unit 204H performs the conversion processing for adjusting the horizontal size, the correction value of which data is stored in the H size register 221b is added to the count value of the H counter 221a for each pixel clock signal CLK. The above-described correction value is a positive value and/or a negative value of which absolute value is orderly and linearly increased for each pixel clock signal CLK.

Figure 13:
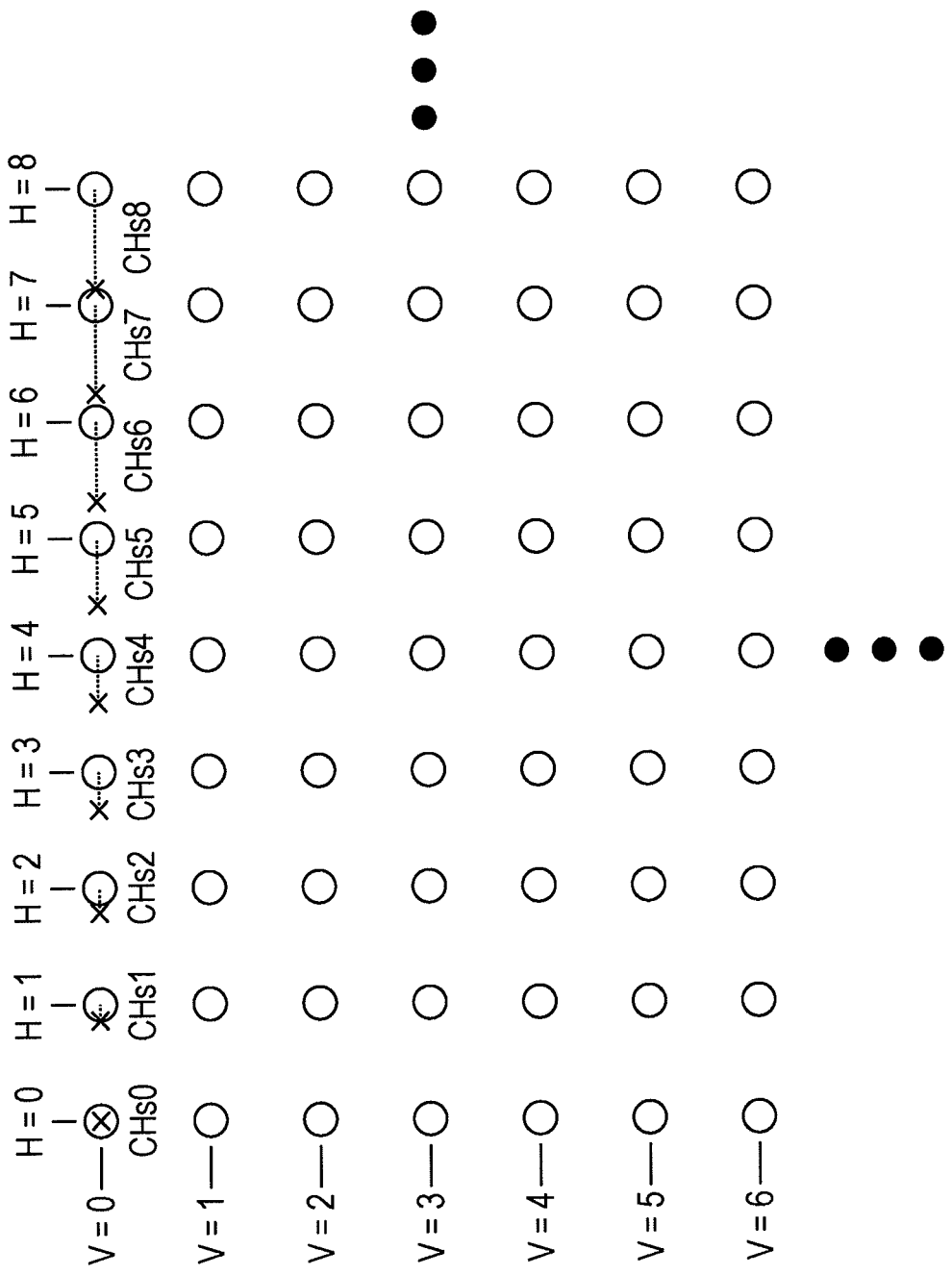
FIG. 13 illustrates the operations of horizontal size adjustment processing (size enlargement) performed by the horizontal conversion unit of the resolution conversion unit.

FIG. 13 shows an exemplary pixel position of a pixel signal of a given line, the pixel signal being generated through the conversion processing performed to enlarge the horizontal size by the vertical conversion unit 204H. According to FIG. 13, negative correction values CHs0, CHs1, CHs2, CHs3, and so forth, where the absolute values of the above-described negative correction values are orderly and linearly increased for each pixel clock signal CLK, are added to the count value of the H counter 221a so that the count value is corrected, where the equation CHs0=0 holds.

As described above, the H control unit 221 sets the read addresses of the line memories selected by the V control unit 211 in the vertical conversion unit 204V based on the count value of the H counter 221a. Since the count value of the H counter 211a is corrected for each pixel clock signal CLK as described above, the intervals between the pixel positions of the lines are narrowed as indicated by the signs "x" shown in FIG. 13 so that the number of the pixels provided in the horizontal direction is increased. Consequently, the horizontal size of the left-eye image QL displayed on the liquid crystal panel 201 is increased so that the horizontal size of the left-eye image PL displayed on the screen 400 is increased.

Figure 14:
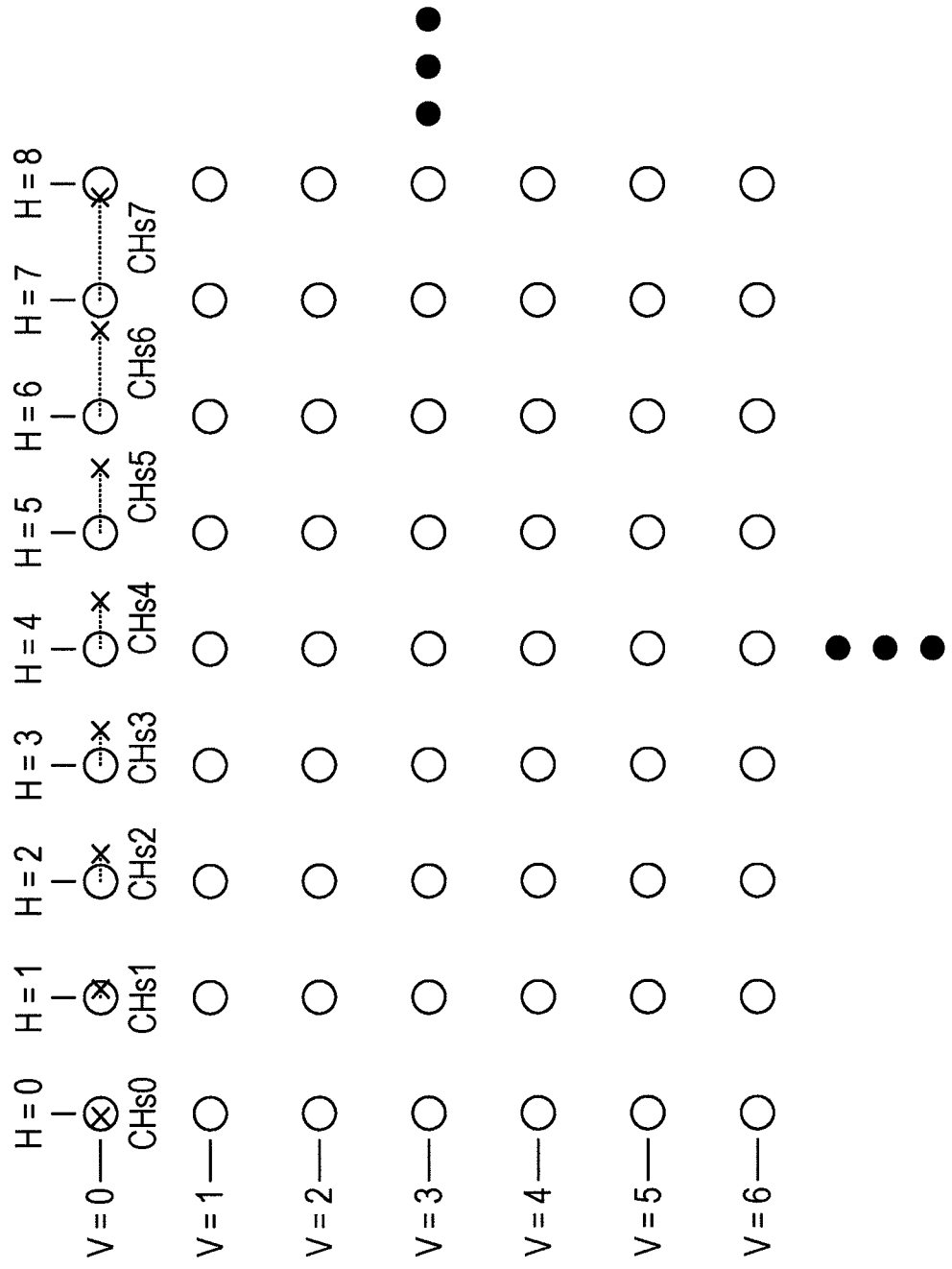
FIG. 14 illustrates the operations of horizontal size adjustment processing (size reduction) performed by the horizontal conversion unit of the resolution conversion unit.

FIG. 14 shows an exemplary pixel position of a pixel signal of a given line, the pixel signal being generated through the conversion processing performed by the horizontal conversion unit 204H so as to reduce the horizontal size. According to FIG. 14, positive correction values CHs0, CHs1, CHs2, CHs3, and so forth, where the absolute values of the above-described positive correction values are orderly and linearly increased for each pixel clock signal CLK, are added to the count value of the H counter 221a so that the count value is corrected, where the equation CHs0=0 holds.

As described above, the H control unit 221 sets the read addresses of the line memories selected by the V control unit 211 in the vertical conversion unit 204V based on the count value of the H counter 221a. Since the count value of the H counter 211a is corrected for each pixel clock signal CLK as described above, the intervals between the pixels of the lines are increased as indicated by the signs "x" shown in FIG. 14 so that the number of the pixels provided in the horizontal direction is decreased. Consequently, the horizontal size of the left-eye image QL displayed on the liquid crystal panel 201 is decreased so that the horizontal size of the left-eye image PL displayed on the screen 400 is decreased.

When being instructed to increase and/or decrease the horizontal size of the left-eye image PL based on the user operation, the correction value data which should be stored in the horizontal size register 221b is set based on the horizontal-size change amount (increase amount and decrease amount). Therefore, the horizontal conversion unit 204H performs the horizontal-size-adjustment processing based on the horizontal-size change amount as descried above so that the horizontal size of the image is increased and/or decreased.

Next, the vertical bow-like distortion correction processing performed through the vertical conversion unit 204V will be described with reference to FIGS. 15 and 16. As described above, the V bow register 211b stores the data of the correction value which should be added to the count value of the V counter 211a for each pixel clock signal CLK when the conversion processing for the vertical bow-like distortion correction is performed. The above-described correction value is determined based on the correction amount of the vertical bow-like distortion of the left-eye image PL.

When the vertical conversion unit 204V performs the conversion processing for correcting the vertical bow-like distortion, the correction value of which data is stored in the V bow register 211b is added to the count value of the V counter 211a for each pixel clock signal CLK. The above-described correction value is a positive value and/or a negative value of which absolute value is changed as if to form a bow shape for each pixel clock signal CLK.

Figure 15:
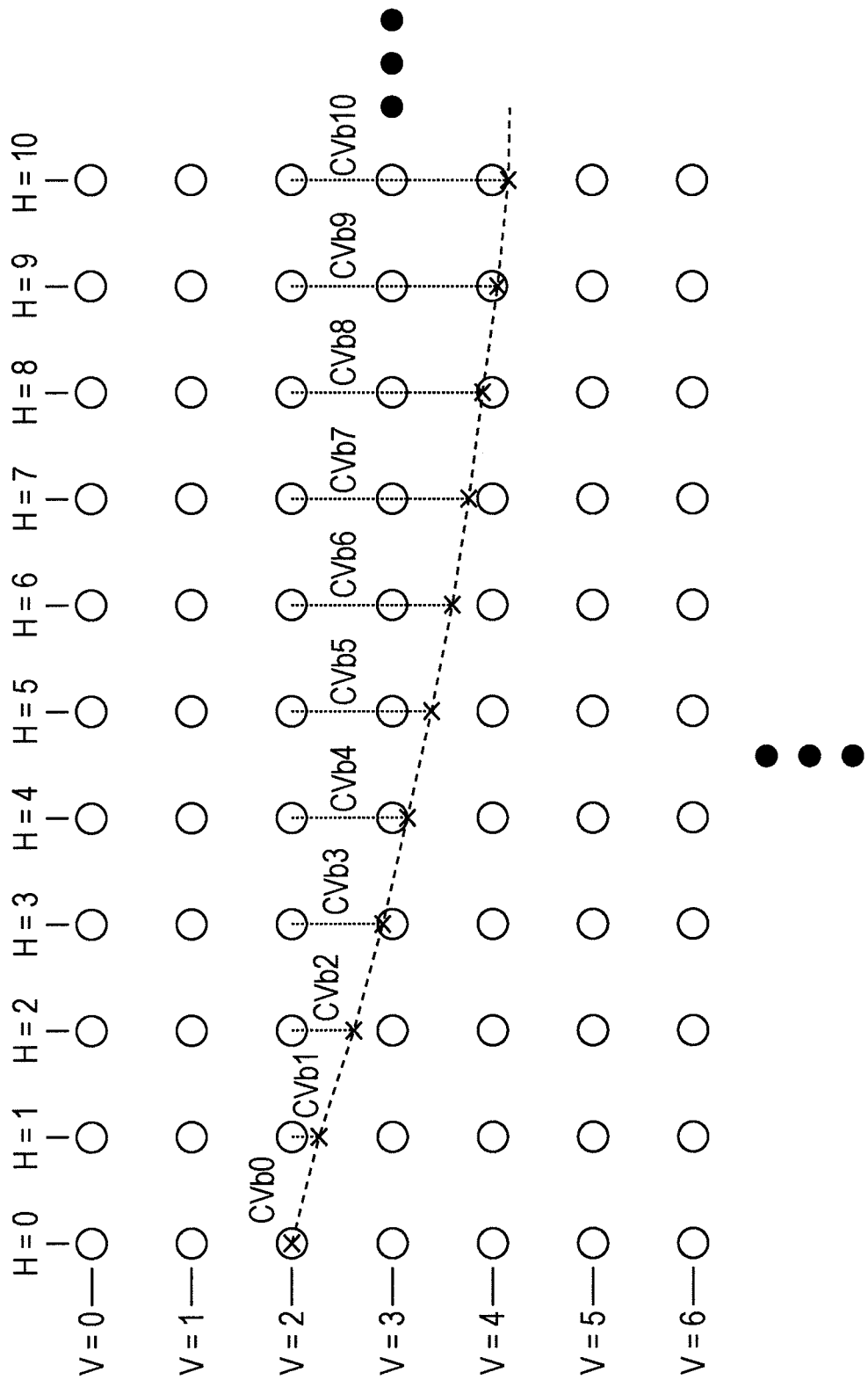
FIG. 15 illustrates vertical bow-like distortion correction processing (downward convex correction) performed by the vertical conversion unit of the resolution conversion unit.

FIG. 15 shows an exemplary pixel position of a pixel signal of a given line, the pixel signal being generated through the conversion processing performed to correct the downwardly convex vertical bow-like distortion by the vertical conversion unit 204V. According to FIG. 15, positive correction values CVb0, CVb1, CVb2, CVb3, and so forth, where the absolute values of the above-described positive correction values are changed as if to form a vertical bow-like shape for each pixel clock signal CLK, are added to the count value of the V counter 211a (where the equation V=2 holds in FIG. 15) so that the count value is corrected, where the equation CVb0=0 holds.

As described above, the V control unit 211 selects the plurality of line memories from which the pixel signals should be read from among the line memories 212-1 to 212-N based on the count value of the V counter 211a. Therefore, the pixel positions of pixel signals of a given line are changed as if to form a downwardly convex vertical bow-like shape as indicated by the signs "x" shown in FIG. 15. In that case, an upwardly convex vertical bow-like distortion occurs in the left-eye image QL displayed on the liquid crystal panel 201. Consequently, the downwardly convex vertical bow-like distortion occurring in the left-eye image PL shown on the screen 400 is corrected.

Figure 16:
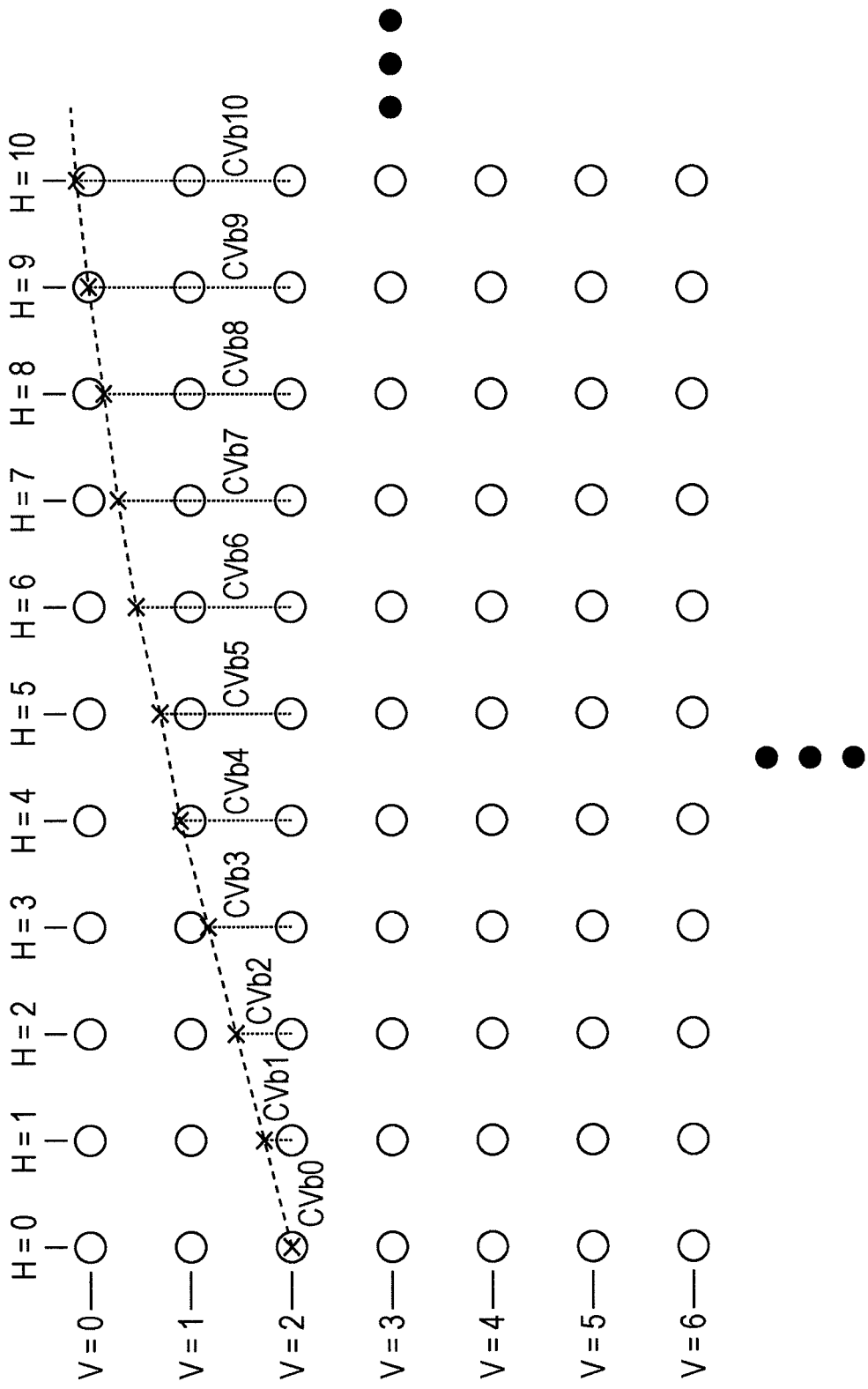
FIG. 16 illustrates vertical bow-like distortion correction processing (upward convex correction) performed by the vertical conversion unit of the resolution conversion unit.

FIG. 16 shows exemplary pixel positions of pixel signals of a given line, the pixel signals being generated through the conversion processing performed to correct the upwardly convex vertical bow-like distortion by the vertical conversion unit 204V. According to FIG. 16, negative correction values CVb0, CVb1, CVb2, CVb3, and so forth, where the absolute values of the above-described negative correction values are changed as if to form a vertical bow-like shape for each pixel clock signal CLK, are added to the count value of the V counter 211a (where the equation V=2 holds in FIG. 16) so that the count value is corrected, where the equation CVb0=0 holds.

As described above, the V control unit 211 selects the plurality of line memories from which the pixel signals should be read from among the line memories 212-1 to 212-N based on the count value of the V counter 211a. Therefore, the pixel positions of pixel signals of a given line are changed as if to form an upwardly convex vertical bow-like shape as indicated by the signs "x" shown in FIG. 16. In that case, a downwardly convex vertical bow-like distortion occurs in the left-eye image QL displayed on the liquid crystal panel 201. Consequently, the upwardly convex vertical bow-like distortion occurring in the left-eye image PL shown on the screen 400 is corrected.

When being instructed to correct the vertical bow-like distortion occurring in the left-eye image PL based on the user operation, the correction value data which should be stored in the V bow register 211b is set based on a correction direction and a correction amount. Consequently, the vertical conversion unit 204V performs the vertical-bow-like distortion correction processing based on the correction direction and the correction amount of the vertical bow-like distortion so that the vertical bow-like distortion occurring in the left-eye image PL is decreased.

Figure 17:
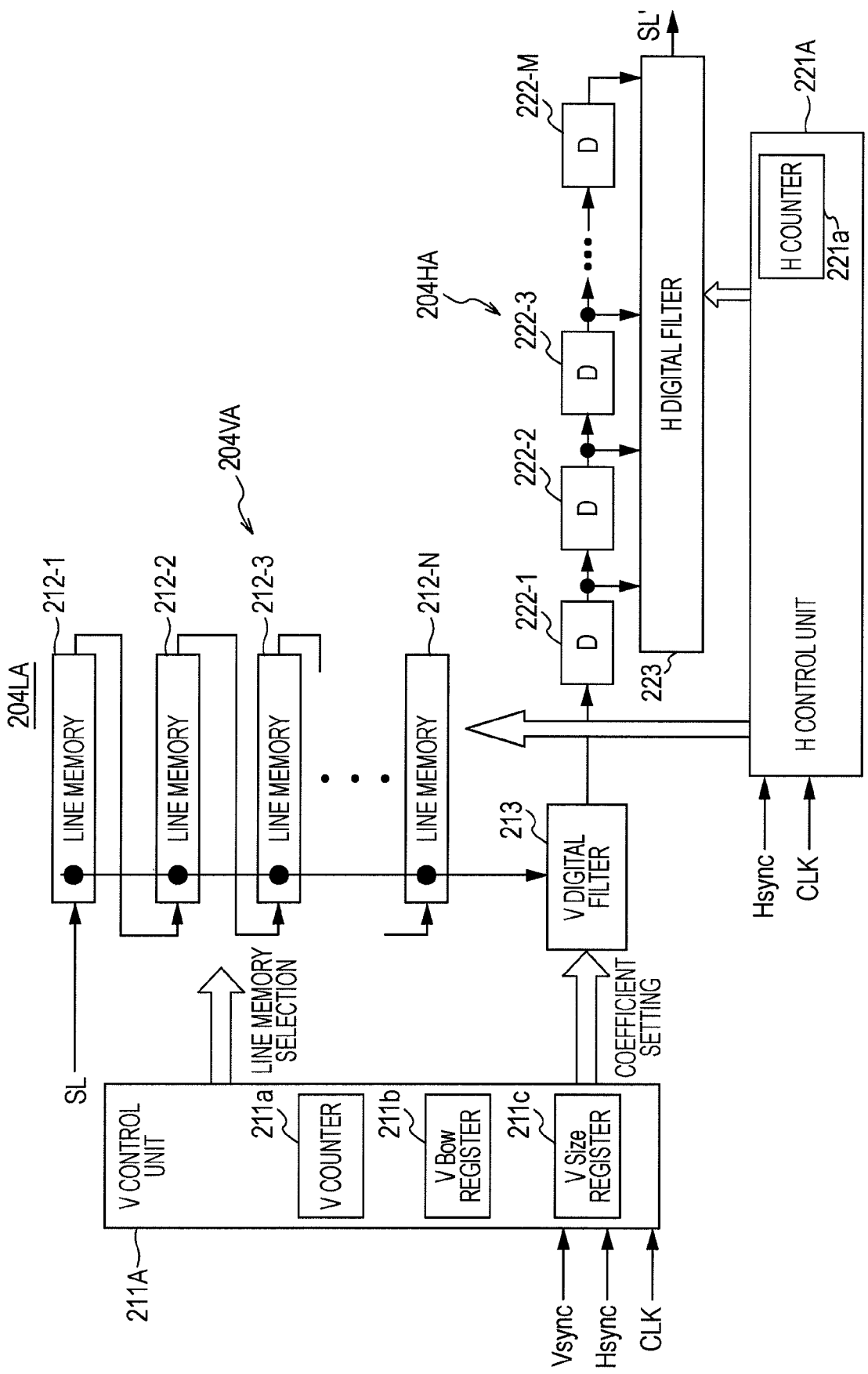
FIG. 17 is a block diagram showing an exemplary configuration of a resolution conversion unit provided for a left-eye image signal (vertical size adjustment and vertical bow-like distortion correction)

FIG. 17 shows an exemplary configuration of a resolution conversion unit 204LA provided for the left-eye image signal SL, where the resolution conversion unit 204LA can perform the conversion processing for the vertical size adjustment and the conversion processing for the vertical-bow-like-distortion correction. In FIG. 17, the same components as those shown in FIG. 8 are designated by the same reference numerals.

The above-described resolution conversion unit 204LA includes a vertical conversion unit 204VA and a horizontal conversion unit 204HA.

With regard to the resolution conversion, the vertical conversion unit 204VA performs vertical resolution conversion processing so as to adjust the number of pixels provided in a vertical direction, and the horizontal conversion unit 204HA performs horizontal resolution conversion processing so as to adjust the number of pixels provided in a horizontal direction. Further, with regard to the vertical size adjustment, the vertical conversion unit 204VA performs conversion processing so as to adjust a vertical size. With regard to the vertical-bowlike-distortion correction, the vertical conversion unit 204VA performs conversion processing so as to correct a vertical bow-like distortion.

The vertical conversion unit 204VA includes a V control unit 211A, a plurality of line memories 212-1 to 212-N, and a V digital filter 213. The line memories 212-1 to 212-N are connected in series. Image signals of the lines, which are included in the left-eye image signal SL transmitted to the line memory 212-1, are orderly forwarded to the subsequent line memory in accordance with the progress of the processing.

The V control unit 211A includes a V counter 211a, a V bow register 211b, and a V size register 211c. The V counter 211a is reset by a vertical synchronization signal Vsync and incremented by a horizontal synchronization signal Hsync. The V bow register 211b stores data of a correction value which should be added to the count value of the V counter 211a for each pixel clock signal CLK when the conversion processing for the vertical-bow-like-distortion correction is performed. The V size register 211c stores data of a correction value which should be added to the count value of the V counter 211a for each horizontal synchronization signal Hsync when the conversion processing for the vertical size adjustment is performed.

The V control unit 211A selects a plurality of line memories from which pixel signals should be read from among the line memories 212-1 to 212-N based on the count value of the V counter 211a. Further, the V control unit 211A sets a coefficient (weight coefficient) by which each of the pixel signals read from the selected line memories should be multiplied to the V digital filter 213.

The V digital filter 213 multiplies the pixel signal read from each of the selected line memories by the set coefficient and totals the pixel signals, and externally transmits a pixel signal obtained through the above-described processing. The setting of read addresses of the selected line memories is made by the horizontal conversion unit 204HA, as will be described later.

Further, the horizontal conversion unit 204HA includes an H control unit 221A, a plurality of pixel delay circuits 222-1 to 222-M, and an H digital filter 223. The pixel delay circuits 222-1 to 222-M are connected in series. Each of pixel signals transmitted from the V digital filter 213 to the pixel delay circuit 222-1 is orderly forwarded to the subsequent pixel delay circuit in accordance with the progress of the processing. The H control unit 221A includes an H counter 221a which is reset by a horizontal synchronization signal Hsync and incremented by a pixel clock signal CLK.

The H control unit 221A sets the read addresses of the line memories selected by the V control unit 211A in the vertical conversion unit 204VA, as described above, based on the count value of the H counter 221a. Further, the H control unit 221A sets a coefficient (weight coefficient) by which each of the pixel signals transmitted from the pixel delay circuits 222-1 to 222-M should be multiplied to the H digital filter 223.

The H digital filter 223 multiplies each of the pixel signals read from the pixel delay circuits 222-1 to 222-M by the set coefficient and totals the pixel signals, and externally transmits a pixel signal obtained through the above-described processing. The above-described signal externally transmitted from the H digital filter 223 becomes the processed left-eye image signal SL'.

Next, operations of the resolution conversion unit 204LA shown in FIG. 17 will be described. Since the operations of vertical resolution conversion processing performed by the vertical conversion unit 204VA, horizontal resolution conversion processing performed by the horizontal conversion unit 204HA, and vertical bow-like distortion correction processing performed by the vertical conversion unit 204VA are equivalent to the operations of the resolution conversion unit 204L shown in FIG. 8 described above, the descriptions thereof will be omitted.

Next, the vertical size adjustment processing performed through the vertical conversion unit 204VA will be described with reference to FIGS. 18 and 19. As described above, the V size register 221c stores the data of the correction value which should be added to the count value of the V counter 211a for each horizontal synchronization signal Hsync when the conversion processing for the vertical size adjustment is performed. The above-described correction value is determined based on the amount of a change in the vertical size (an enlargement amount and a reduction amount).

When the vertical conversion unit 204VA performs the conversion processing for adjusting the vertical size, the correction value of which data is stored in the V size register 211b is added to the count value of the V counter 211a for each horizontal synchronization signal Hsync. The above-described correction value is a positive value and/or a negative value of which absolute value is orderly and linearly increased for each horizontal synchronization signal Hsync.

Figure 18:
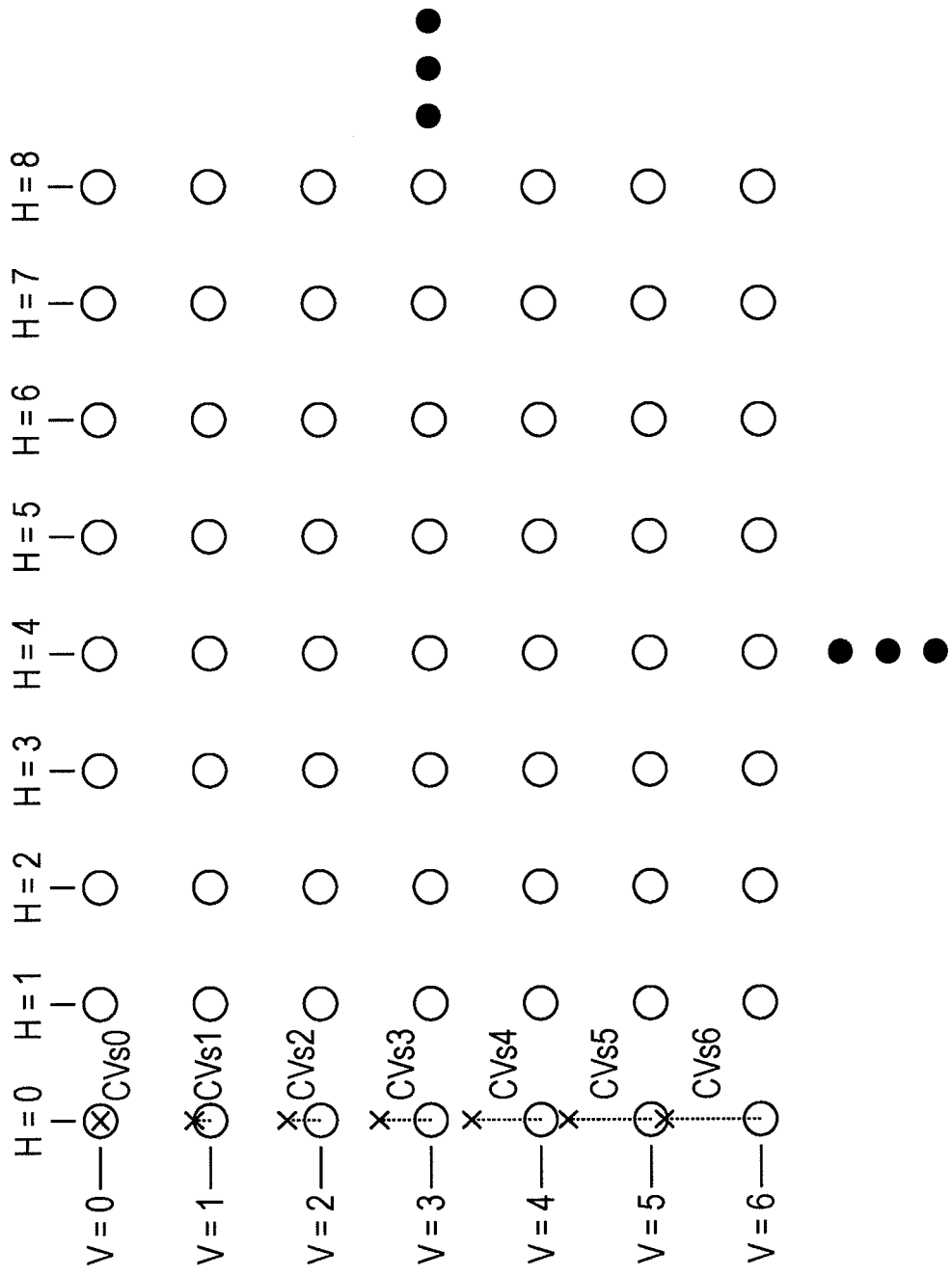
FIG. 18 illustrates the operations of vertical size adjustment processing (size enlargement) performed by the vertical conversion unit of the resolution conversion unit.

FIG. 18 shows exemplary pixel positions of pixel signals of a given vertical column, the pixel signals being generated through the conversion processing performed to increase the vertical size by the vertical conversion unit 204VA. According to FIG. 18, negative correction values CVs0, CVs1, CVs2, CVs3, and so forth, where the absolute values of the above-described negative correction values are orderly and linearly increased for each horizontal synchronization signal Hsync, are added to the count value of the vertical counter 211a so that the count value is corrected, where the equation CVs0=0 holds.

As described above, the V control unit 211A selects the plurality of line memories from which the pixel signals should be read from among the line memories 212-1 to 212-N based on the count value of the vertical counter 211a. Since the count value of the V counter 211a is corrected for each horizontal synchronization signal Hsync as described above, the intervals between the pixel positions of pixel signals of the vertical columns are decreased as indicated by the signs "x" so that the number of the pixels provided in the vertical direction is increased. Consequently, the vertical size of the left-eye image QL displayed on the liquid crystal panel 201 is increased so that the vertical size of the left-eye image PL displayed on the screen 400 is increased.

Figure 19:
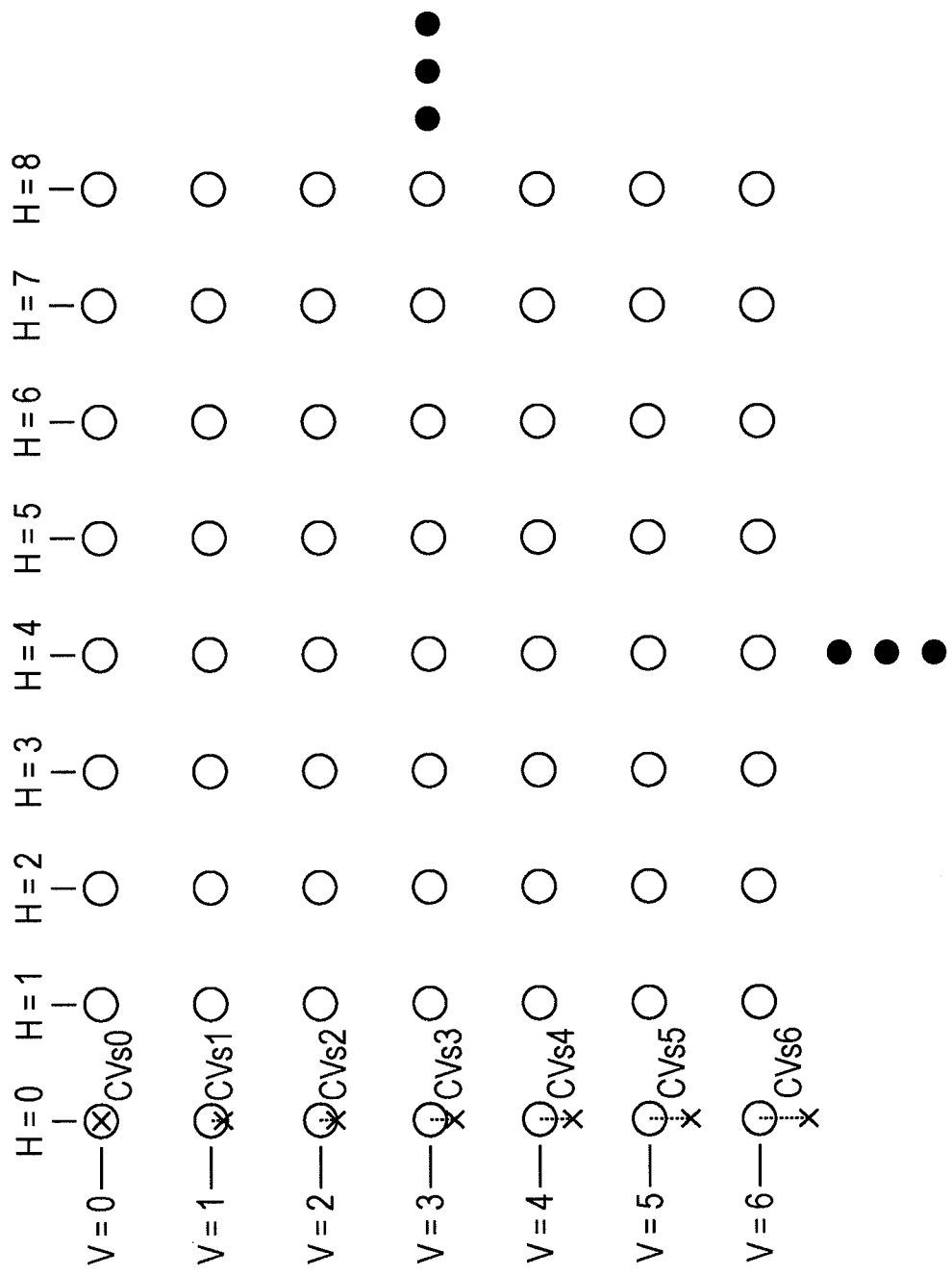
FIG. 19 illustrates the operations of vertical size adjustment processing (size reduction) performed by the vertical conversion unit of the resolution conversion unit.

FIG. 19 shows exemplary pixel positions of pixel signals of a given vertical column, the pixel signals being generated through the conversion processing performed by the vertical conversion unit 204VA so as to reduce the vertical size. According to FIG. 19, positive correction values CVs0, CVs1, CVs2, CVs3, and so forth, where the absolute values of the above-described positive correction values are orderly and linearly increased for each horizontal synchronization signal Hsync, are added to the count value of the vertical counter 211a so that the count value is corrected, where the equation CVs0=0 holds.

As described above, the V control unit 211A selects the plurality of line memories from which the pixel signals should be read from among the line memories 212-1 to 212-N based on the count value of the vertical counter 211a. Since the count value of the V counter 211a is corrected for each horizontal synchronization signal Hsync as described above, the intervals between the pixel positions of pixel signals of the vertical columns are increased as indicated by the signs "x" so that the number of the pixels provided in the vertical direction is decreased. Consequently, the vertical size of the left-eye image QL displayed on the liquid crystal panel 201 is decreased so that the vertical size of the left-eye image PL displayed on the screen 400 is decreased.

The vertical conversion unit 204VA performs the vertical-bow-like-distortion correction processing as described above in addition to the above-described vertical size adjustment processing. Although the detailed description will be omitted, when the vertical conversion unit 204VA performs the conversion processing for correcting the vertical bow-like distortion, the correction value of which data is stored in the V bow register 211b is added to the count value of the V counter 211a for each pixel clock signal CLK. Consequently, the correction value provided to attain the vertical bow-like distortion correction is added to the count value of the V counter 211a of the vertical conversion unit 204VA for each pixel clock signal CLK, and the correction value provided to attain the vertical size adjustment is also added to the count value of the V counter 211a of the vertical conversion unit 204VA for each horizontal synchronization signal Hsync. Therefore, the vertical size adjustment processing and the vertical bow-like distortion correction processing are performed at the same time in the vertical conversion unit 204VA.

Figure 20:
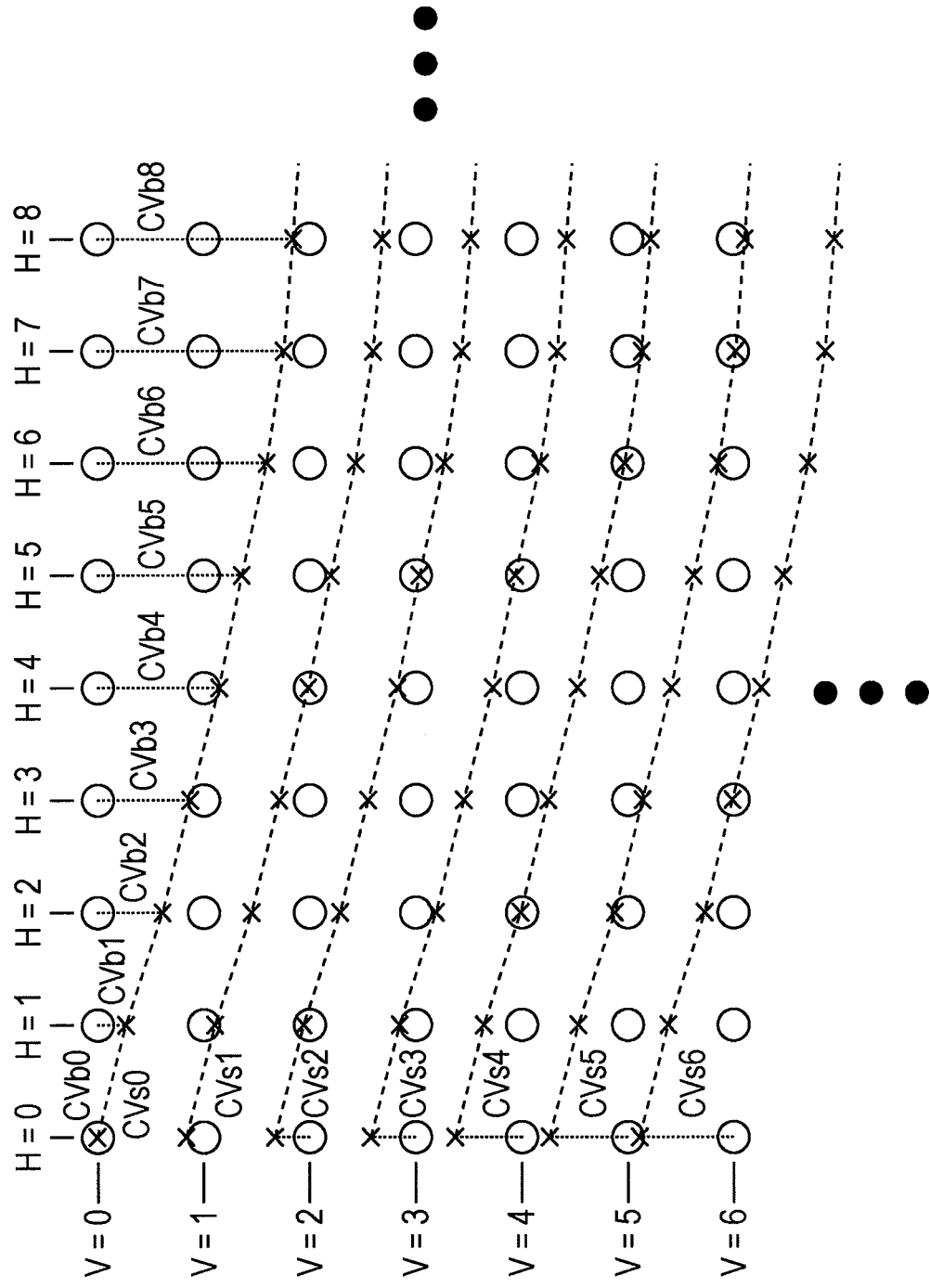
FIG. 20 illustrates the operations of vertical size adjustment processing (size enlargement) and vertical bow-like distortion correction processing (downward convex correction) that are performed by the vertical conversion unit of the resolution conversion unit.

For example, FIG. 20 shows exemplary pixel positions of pixel signals of lines and vertical columns, the pixel signals being generated through the vertical conversion unit 204VA performing the conversion processing for increasing the vertical size and the conversion processing for correcting the downwardly convex vertical bow-like distortion. According to FIG. 20, the negative correction values CVs0, CVs1, CVs2, CVs3, and so forth, where the absolute values of the above-described negative correction values are orderly and linearly increased for each horizontal synchronization signal Hsync, are added to the count value of the vertical counter 211a so that the count value is corrected. Further, according to FIG. 20, the positive correction values CVb0, CVb1, CVb2, CVb3, and so forth, where the absolute values of the above-described positive correction values are changed as if to form the vertical bow-like shape for each pixel clock signal CLK, are added to the count value of the V counter 211a so that the count value is corrected.

As described above, the V control unit 211A selects the plurality of line memories from which the pixel signals should be read from among the line memories 212-1 to 212-N based on the count value of the vertical counter 211a. Since the count value of the V counter 211a is corrected for each horizontal synchronization signal Hsync as described above, the intervals between the pixel positions of the pixel signals of the vertical columns are decreased as indicated by the signs "x" shown in FIG. 20 so that the number of the pixels provided in the vertical direction is increased. Consequently, the vertical size of the left-eye image QL displayed on the liquid crystal panel 201 is increased so that the vertical size of the left-eye image PL displayed on the screen 400 is increased.

Further, since the count value of the V counter 211a is corrected for each pixel clock signal CLK as described above, the pixel positions of pixel signals of each line are changed as if to form a downwardly convex vertical bow-like shape as indicated by the signs "x" shown in FIG. 20. Consequently, an upwardly convex vertical bow-like distortion occurs in the left-eye image QL displayed on the liquid crystal panel 201 so that a downwardly convex vertical bow-like distortion occurring in the left-eye image PL displayed on the screen 400 is corrected.

When being instructed to increase and/or decrease the vertical size of the left-eye image PL based on the user operation, the correction value data which should be stored in the vertical size register 211c is set based on the vertical-size change amount (increase amount and decrease amount). Therefore, the vertical conversion unit 204VA performs the vertical-size-adjustment processing based on the vertical-size change amount as descried above so that the vertical size of the image is increased and/or decreased.

As described above, the projector 200 provided in the stereoscopic-image projection apparatus 10 shown in FIG. 1 can adjust the horizontal and/or vertical size of each of the images PL and PR that are displayed on the screen 400 and perform the conversion processing for correcting the vertical bow-like distortion through the resolution conversion unit 204. Therefore, it becomes possible to appropriately correct displacement occurring between the images PL and PR when the images PL and PR are superimposed on each other and displayed on the screen 400 through the 3D projection optical system 300, where the images PL and PR had been aligned and displayed in a vertical direction on the display panel 201.

2. Exemplary Modifications

As described above, displacement may occur between the left-eye image PL and the right-eye image PR that are displayed on the screen 400 due to (1) the difference between aspect ratios, (2) the difference between vertical bow-like distortions, and (3) shifts toward a horizontal direction and a vertical direction. According to the above-described embodiment, the displacement occurring between the images PL and PR due to the above-described shifts toward the horizontal direction and the vertical direction can be corrected through lens shifting, for example. However, there may be a case where the value of the displacement occurring between the images PL and PR due to the shifts toward the horizontal and vertical directions goes beyond the range of values that can be corrected through the lens shifting.

Therefore, the resolution conversion unit 204 of the projector 200 may be configured to be capable of performing conversion processing for attaining horizontal and/or vertical shifting in addition to the conversion processing for adjusting the horizontal size and/or the vertical size, and the conversion processing for correcting the vertical bow-like distortion. Hereinafter, an example where the resolution conversion unit 204 can perform the conversion processing for attaining the horizontal and/or vertical shifting will be described. In that case, the resolution conversion unit 204 performs the following operations.

When being instructed to horizontally shift the images PL and PR based on the user operation, the resolution conversion unit 204 performs the conversion processing for the image signals SL and SR, so as to shift the images QL and QR that are displayed on the liquid crystal panel 201 in a horizontal direction. Consequently, the images QL and QR that are displayed on the liquid crystal panel 201 are shifted toward the horizontal direction so that the images PL and PR that are displayed on the screen 400 are shifted in the horizontal direction.

Figure 21:
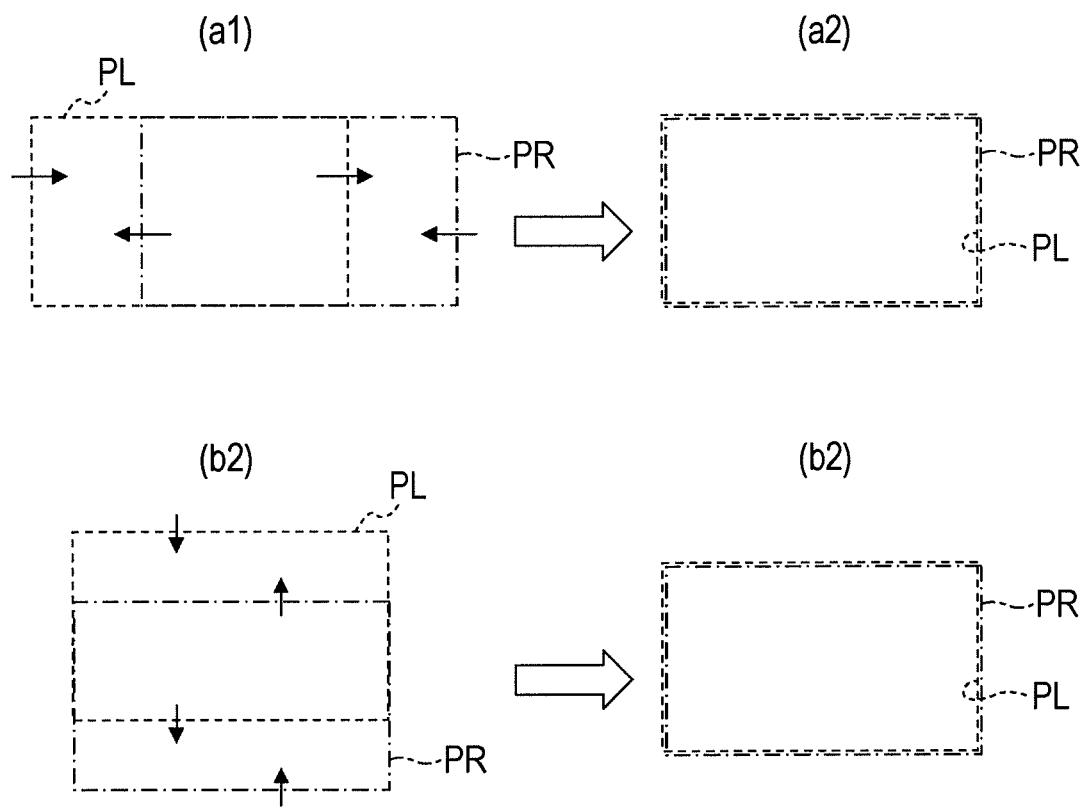
FIG. 21 illustrates horizontal shift adjustment and vertical shift adjustment that are performed by the resolution conversion unit.

Thus, the images PL and PR that are displayed on the screen 400 can be shifted in the horizontal direction based on the user operation. Therefore, if displacement occurs between the images PL and PR due to the shift occurring in the horizontal direction, the displacement can be eliminated. For example, if displacement occurs between the images PL and PR that are displayed on the screen 400 due to the horizontal shifting, as shown in Part (a1) of FIG. 21, the displacement can be eliminated by horizontally shifting at least one of the images PL and PR, as shown in Part (a2) of FIG. 21. According to Part (a1) of FIG. 21, the left-eye image PL is shown on the left side and the right-eye image PR is shown on the right side. However, the positions of the left-eye image PL and the right-eye image PR may be reversed.

When being instructed to vertically shift the images PL and PR based on the user operation, the resolution conversion unit 204 performs the conversion processing for the image signals SL and SR, so as to shift the images QL and QR that are displayed on the liquid crystal panel 201 in a vertical direction. Consequently, the images QL and QR that are displayed on the liquid crystal panel 201 are shifted in the vertical direction so that the images PL and PR that are displayed on the screen 400 are shifted in the vertical direction as well.

Thus, the images PL and PR that are displayed on the screen 400 can be shifted in the vertical direction based on the user operation. Therefore, if displacement occurs between the images PL and PR due to the shift occurring in the vertical direction, the displacement can be eliminated. For example, if displacement occurs between the images PL and PR that are displayed on the screen 400 due to the vertical shifting, as shown in Part (b1) of FIG. 21, the displacement can be eliminated by vertically shifting at least one of the images PL and PR, as shown in Part (b2) of FIG. 21. According to Part (b1) of FIG. 21, the left-eye image PL is shown on the upper side and the right-eye image PR is shown on the lower side. However, the positions of the left-eye image PL and the right-eye image PR may be reversed.

In that case, the user can select independent mode and/or interlock mode, as operation mode in which the images PL and PR are horizontally and/or vertically shifted. When the user performs an operation in the independent mode, the resolution conversion unit 204 performs the following conversion processing. Namely, the resolution conversion unit 204 performs conversion processing for the image signal corresponding to only one of the images PL and PR, where the user had issued an instruction to shift the only one of the images PL and PR horizontally and/or vertically, so that horizontal and/or vertical shifting conversion processing is performed for the image signal corresponding to the only one image.

When the user performs an operation in the interlock mode, the resolution conversion unit 204 performs the following conversion processing. Namely, the resolution conversion unit 204 performs the horizontal and/or vertical shifting conversion processing for each of the image signals SL and SR so that the shifting is performed for not only one of the images PL and PR, where the user had issued the instruction to perform the horizontal and/or vertical shifting for the above-described only one image, but also both images PL and PR. In that case, if the image for which the user had issued the instruction to perform the horizontal and/or vertical shifting is shifted in one direction, the other image is shifted in the reverse direction.

In the above-descried interlock mode, the displacement occurring between the images PL and PR that are displayed on the screen 400 due to the horizontal and/or vertical shifting is corrected by bringing both the images close to each other. Consequently, the user may not perform shift adjustment by separately determining in which directions the images PL and PR should be shifted, which facilitates shift adjustment operations.

Figure 22:
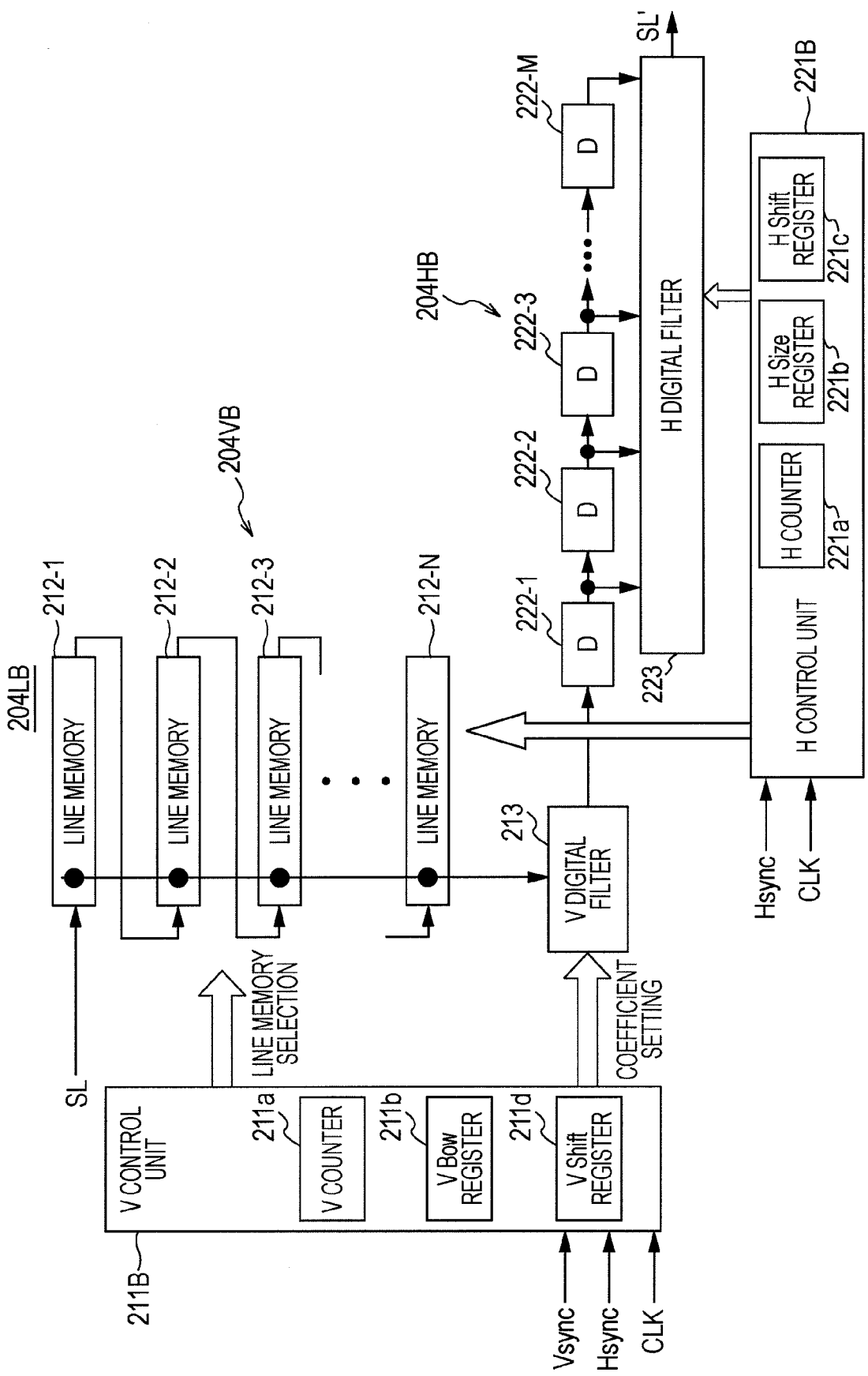
FIG. 22 is a block diagram showing an exemplary configuration of a resolution conversion unit provided for a left-eye image signal (horizontal size adjustment, vertical bow-like distortion correction, and horizontal and/or vertical shifting)

FIG. 22 shows an exemplary configuration of a resolution conversion unit 204LB provided for the left-eye image signal SL, where the resolution conversion unit 204LB can perform the conversion processing for the horizontal size adjustment, the conversion processing for the vertical-bow-like-distortion correction, and the conversion processing for the horizontal and/or vertical shifting. The above-described resolution conversion unit 204LB includes a vertical conversion unit 204VB and a horizontal conversion unit 204HB. In FIG. 22, the same components as those shown in FIG. 8 are designated by the same reference numerals.

With regard to the resolution conversion, the vertical conversion unit 204VB performs vertical resolution conversion processing so as to adjust the number of pixels provided in a vertical direction, and the horizontal conversion unit 204HB performs horizontal resolution conversion processing so as to adjust the number of pixels provided in a horizontal direction. Further, with regard to the horizontal size adjustment, the horizontal conversion unit 204HB performs conversion processing so as to adjust a horizontal size. With regard to the vertical-bow-like-distortion correction, the vertical conversion unit 204VB performs conversion processing so as to correct a vertical bow-like distortion. With regard to the horizontal and/or vertical shifting, the horizontal conversion unit 204HB performs the horizontal-shifting conversion processing and the vertical conversion unit 204VB performs the vertical-shifting conversion processing.

The vertical conversion unit 204VB includes a V control unit 211B, the plurality of line memories 212-1 to 212-N, and the V digital filter 213. The line memories 212-1 to 212-N are connected in series. Image signals of the lines, which are included in the left-eye image signal SL transmitted to the line memory 212-1, are orderly forwarded to the subsequent line memory in accordance with the progress of the processing.

The V control unit 211B includes the V counter 211a, the V bow register 211b, and a V shift register 211d. The V counter 211a is reset by the vertical synchronization signal Vsync and incremented by the horizontal synchronization signal Hsync. The V bow register 211b stores the data of the correction value which should be added to the count value of the V counter 211a for each pixel clock signal CLK when the conversion processing for the vertical-bow-like-distortion correction is performed. The V shift register 211d stores data of an initial value affecting the V counter 211a rest by the vertical synchronization signal Vsync when the conversion processing for attaining the vertical shifting is performed.

The V control unit 211B selects a plurality of line memories from which pixel signals should be read from among the line memories 212-1 to 212-N based on the count value of the V counter 211a. Further, the V control unit 211B sets a coefficient (weight coefficient) by which each of the pixel signals read from the selected line memories should be multiplied to the V digital filter 213.

The V digital filter 213 multiplies the pixel signal read from each of the selected line memories by the set coefficient and totals the pixel signals, and externally transmits a pixel signal obtained through the above-described processing. The setting of read addresses of the selected line memories is made by the horizontal conversion unit 204HB, as will be described later.

Further, the horizontal conversion unit 204HB includes an H control unit 221B, the plurality of pixel delay circuits 222-1 to 222-M, and the H digital filter 223. The pixel delay circuits 222-1 to 222-M are connected in series. Each of pixel signals transmitted from the V digital filter 213 to the pixel delay circuit 222-1 is orderly forwarded to the subsequent pixel delay circuit in accordance with the progress of the processing.

The H control unit 221B includes the H counter 221a, the H size register 221b, and an H shift register 221c. The H counter 221a is reset by the horizontal synchronization signal Hsync and incremented by the pixel clock signal CLK. The H size register 221b stores the data of the correction value which should be added to the count value of the H counter 221a for each pixel clock signal CLK when the conversion processing for the horizontal size adjustment is performed. The H shift register 211*c* stores data of an initial value affecting the H counter 211*a* rest by the horizontal synchronization signal Hsync when the conversion processing for attaining the horizontal shifting is performed.

The H control unit 221B sets the read addresses of the line memories selected by the V control unit 211B in the vertical conversion unit 204VB, as described above, based on the count value of the H counter 221*a*. Further, the H control unit 221B sets a coefficient (weight coefficient) by which each of the pixel signals transmitted from the pixel delay circuits 222-1 to 222-M should be multiplied to the H digital filter 223.

The H digital filter 223 multiplies each of the pixel signals transmitted from the pixel delay circuits 222-1 to 222-M by the set coefficient and totals the pixel signals, and externally transmits a pixel signal obtained through the above-described processing. The above-described signal externally transmitted from the H digital filter 223 becomes the processed left-eye image signal SL'.

Next, operations of the resolution conversion unit 204LB shown in FIG. 22 will be described. Since the operations of vertical resolution conversion processing and vertical bow-like distortion correction processing that are performed by the vertical conversion unit 204VB, and horizontal resolution conversion processing and horizontal size adjustment processing that are performed by the horizontal conversion unit 204HA are equivalent to the operations of the resolution conversion unit 204L shown in FIG. 8 described above, the descriptions thereof will be omitted.

Vertical shifting processing performed by the vertical conversion unit 204VB will be described. As described above, the V shift register 211*d* stores the data of the initial value affecting the V counter 211*a* reset by the vertical synchronization signal Vsync when the conversion processing is performed to attain the vertical shifting. The above-described initial value is a positive value and/or a negative value determined based on the shift amount. When the vertical conversion unit 204VB performs the conversion processing so as to attain the vertical shifting, the initial value of which data is stored in the V shift register 211*d* affects the V counter 211*a* when the V counter 211*a* is reset by the vertical synchronization signal Vsync.

Figure 23:
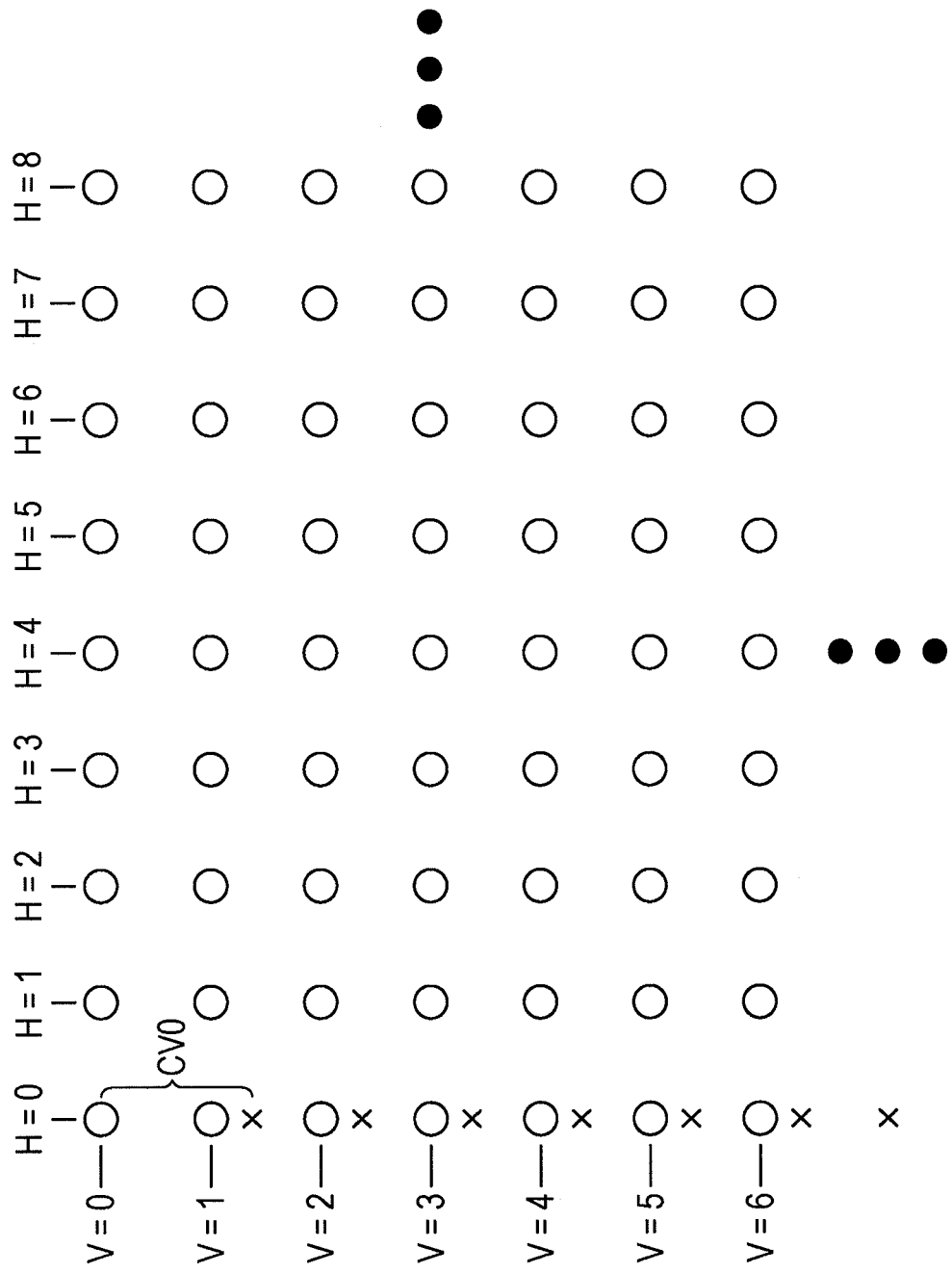
FIG. 23 illustrates the operations of vertical shift processing (upward shifting) performed by the vertical conversion unit of the resolution conversion unit.

FIG. 23 shows exemplary pixel positions of pixel signals of a given vertical column, the pixel signals being generated through conversion processing performed to attain upward shifting through the vertical conversion unit 204VB. According to FIG. 23, a positive initial value CV0 affects the V counter 211*a* reset by the vertical synchronization signal Vsync. As described above, the V control unit 211B selects a plurality of line memories from which pixel signals should be read from among the line memories 212-1 to 212-N based on the count value of the vertical counter 211*a*. Since the initial value of the V counter 211*a* is determined to be CV0, the pixel positions of the pixel signals of each vertical column are downwardly shifted in general, as indicated by the signs "x" shown in FIG. 23. Therefore, the left-eye image QL displayed on the liquid crystal panel 201 is upwardly shifted by as much as the initial value CV0 so that the left-eye image PL displayed on the screen 400 is upwardly shifted by as much as the initial value CV0.

Figure 24:
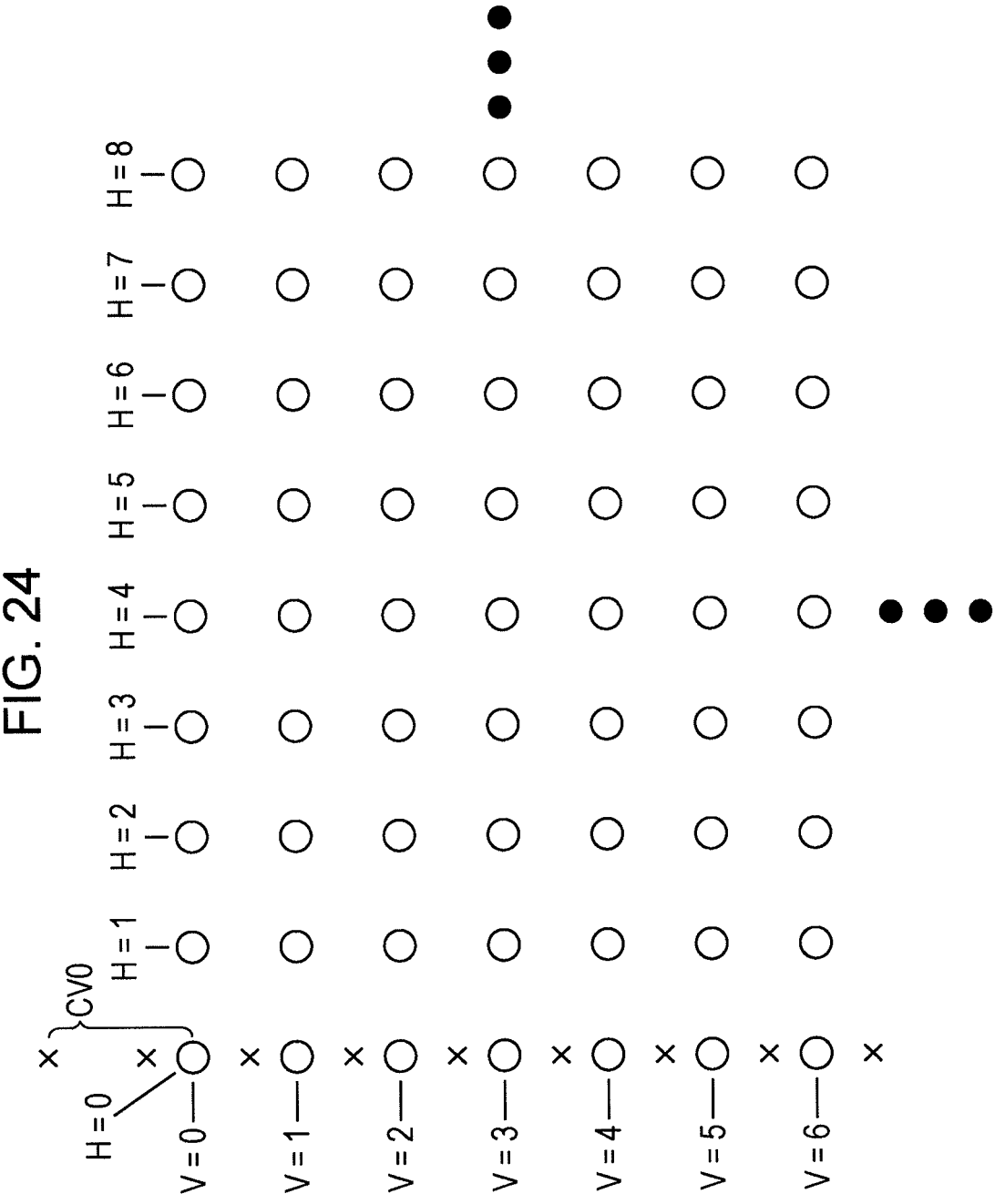
FIG. 24 illustrates the operations of vertical shift processing (downward shifting) performed by the vertical conversion unit of the resolution conversion unit.

FIG. 24 shows exemplary pixel positions of pixel signals of a given vertical column, the pixel signals being generated through conversion processing performed to attain downward shifting through the vertical conversion unit 204VB. According to FIG. 24, a negative initial value CV0 affects the V counter 211*a* reset by the vertical synchronization signal Vsync. As described above, the V control unit 211B selects a plurality of line memories from which pixel signals should be read from among the line memories 212-1 to 212-N based on the count value of the vertical counter 211*a*. Since the initial value of the V counter 211*a* is determined to be CV0, the pixel positions of the pixel signals of each vertical column are upwardly shifted in general, as indicated by the signs "x" shown in FIG. 24. Therefore, the left-eye image QL displayed on the liquid crystal panel 201 is downwardly shifted by as much as the initial value CV0 so that the left-eye image PL displayed on the screen 400 is downwardly shifted by as much as the initial value CV0.

Vertical shifting processing performed by the horizontal conversion unit 204HB will be described. As described above, the H shift register 211*c* stores the data of the initial value affecting the H counter 221*a* reset by the horizontal synchronization signal Hsync when the conversion processing is performed to attain the horizontal shifting. The above-described initial value is a positive value and/or a negative value determined based on the shift amount. When the horizontal conversion unit 204HB performs the conversion processing so as to attain the horizontal shifting, the initial value of which data is stored in the H shift register 221*c* affects the H counter 221*a* when the H counter 221*a* is reset by the horizontal synchronization signal Hsync.

Figure 25:
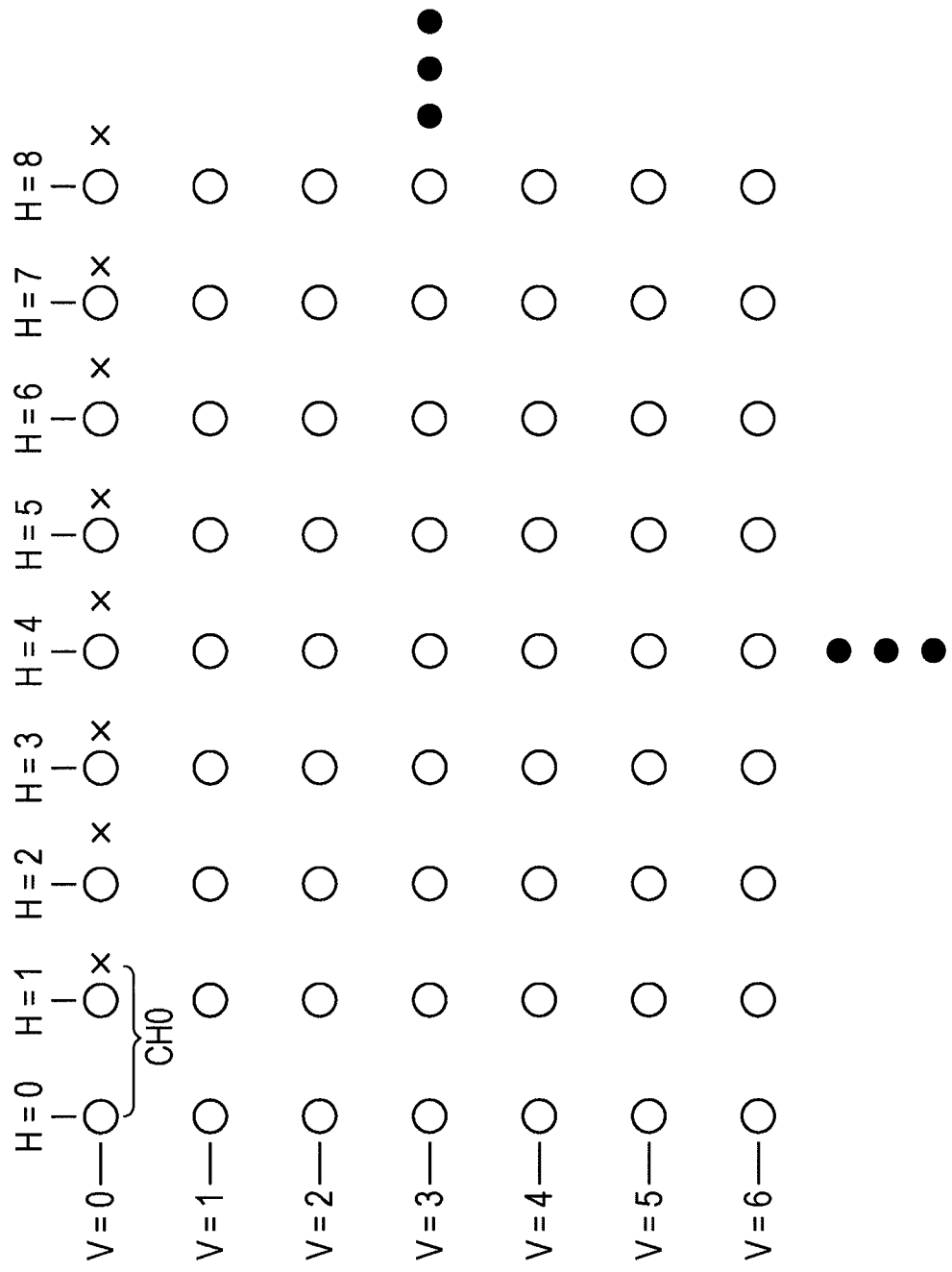
FIG. 25 illustrates the operations of horizontal shift processing (leftward shifting) performed by the horizontal conversion unit of the resolution conversion unit.

FIG. 25 shows exemplary pixel positions of pixel signals of a given line, the pixel signals being generated through conversion processing performed to attain leftward shifting through the horizontal conversion unit 204HB. According to FIG. 25, a positive initial value CH0 affects the H counter 221*a* reset by the horizontal synchronization signal Hsync. As described above, the H control unit 221B sets the read addresses of the line memories selected by the V control unit 211B in the vertical conversion unit 204VB as described above based on the count value of the horizontal counter 221*a*. Since the initial value of the H counter 211*a* is determined to be CH0, the pixel positions of the pixel signals of each line are shifted rightward in general, as indicated by the signs "x" shown in FIG. 25. Therefore, the left-eye image QL displayed on the liquid crystal panel 201 is shifted leftward by as much as the initial value CH0 so that the left-eye image PL displayed on the screen 400 is shifted leftward by as much as the initial value CH0.

Figure 26:
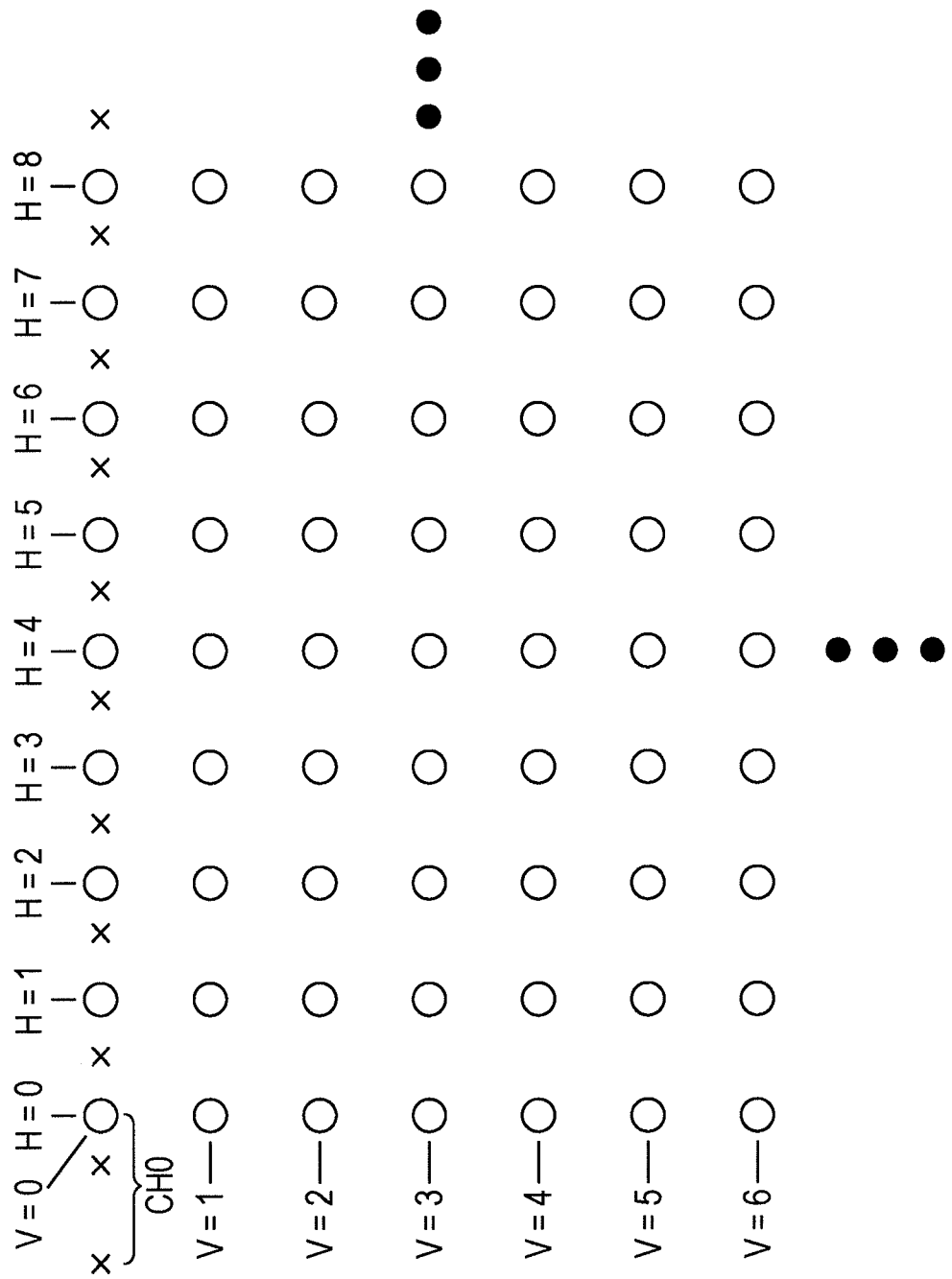
FIG. 26 illustrates the operations of horizontal shift processing (rightward shifting) performed by the horizontal conversion unit of the resolution conversion unit.

FIG. 26 shows exemplary pixel positions of pixel signals of a given vertical column, the pixel signals being generated through conversion processing performed to attain rightward shifting through the horizontal conversion unit 204HB. According to FIG. 26, a negative initial value CH0 affects the H counter 221*a* reset by the horizontal synchronization signal Hsync. As described above, the H control unit 221B sets the read addresses of the line memories selected by the V control unit 211B in the vertical conversion unit 204VB as described above based on the count value of the horizontal counter 221*a*. Since the initial value of the H counter 211*a* is determined to be CH0, the pixel positions of the pixel signals of each line are shifted leftward in general, as indicated by the signs "x" shown in FIG. 26. Therefore, the left-eye image QL displayed on the liquid crystal panel 201 is shifted rightward by as much as the initial value CH0 so that the left-eye image PL displayed on the screen 400 is shifted rightward by as much as the initial value CH0.

When being instructed to shift the left-eye image PL horizontally and/or vertically, an initial value of which data should be stored in the horizontal shift register 221*c* and the vertical shift register 211*d* is set based on the shift amount. Therefore, as described above, horizontal and/or vertical shifting processing is performed in the horizontal conversion unit 204HB and the vertical conversion unit 204VB based on the shift amount so that an image is horizontally and vertically shifted.

FIG. 27 shows an exemplary configuration of a resolution conversion unit 204LC provided for the left-eye image signal SL, where the resolution conversion unit 204LC can perform the conversion processing for the vertical size adjustment, the conversion processing for the vertical-bow-like-distortion correction, and conversion processing for the horizontal and/or vertical shifting. The above-described resolution conversion unit 204LC includes a vertical conversion unit 204VC and a horizontal conversion unit 204HC. In FIG. 27, the same components as those shown in FIGS. 17 and 22 are designated by the same reference numerals.

With regard to the resolution conversion, the vertical conversion unit 204VC performs vertical resolution conversion processing so as to adjust the number of pixels provided in a vertical direction, and the horizontal conversion unit 204HC performs horizontal resolution conversion processing so as to adjust the number of pixels provided in a horizontal direction. Further, with regard to the vertical size adjustment, the vertical conversion unit 204VC performs conversion processing so as to adjust a vertical size. With regard to the vertical-bow-like-distortion correction, the vertical conversion unit 204VC performs conversion processing so as to correct a vertical bow-like distortion. With regard to the horizontal and/or vertical shifting, the horizontal conversion unit 204HC performs conversion processing so as to attain the horizontal shifting and the vertical conversion unit 204VC performs conversion processing so as to attain the vertical shifting.

The vertical conversion unit 204VC includes a V control unit 211C, a plurality of line memories 212-1 to 212-N, and a V digital filter 213. The line memories 212-1 to 212-N are connected in series. Image signals of the lines, which are included in the left-eye image signal SL transmitted to the line memory 212-1, are orderly forwarded to the subsequent line memory in accordance with the progress of the processing.

The V control unit 211C includes a V counter 211a, a V bow register 211b, a V size register 211c, and a V shift register 211d. The V counter 211a is reset by a vertical synchronization signal Vsync and incremented by a horizontal synchronization signal Hsync. The V bow register 211b stores data of a correction value which should be added to the count value of the V counter 211a for each pixel clock signal CLK when the conversion processing for the vertical-bow-like-distortion correction is performed. The V size register 211c stores data of a correction value which should be added to the count value of the V counter 211a for each horizontal synchronization signal Hsync when the conversion processing for the vertical size adjustment is performed. The V shift register 211d stores data of an initial value affecting the V counter 211a reset by the vertical synchronization signal Vsync when the conversion processing for the vertical shifting is performed.

The V control unit 211C selects a plurality of line memories from which pixel signals should be read from among the line memories 212-1 to 212-N based on the count value of the V counter 211a. Further, the V control unit 211C sets a coefficient (weight coefficient) by which each of the pixel signals read from the selected line memories should be multiplied to the V digital filter 213.

The V digital filter 213 multiplies the pixel signal read from each of the selected line memories by the set coefficient and totals the pixel signals, and externally transmits a pixel signal obtained through the above-described processing. The setting of read addresses of the selected line memories is made by the horizontal conversion unit 204HC, as will be described later.

Further, the horizontal conversion unit 204HC includes an H control unit 221C, a plurality of pixel delay circuits 222-1 to 222-M, and an H digital filter 223. The pixel delay circuits 222-1 to 222-M are connected in series. Each of pixel signals transmitted from the V digital filter 213 to the pixel delay circuit 222-1 is orderly forwarded to the subsequent pixel delay circuit in accordance with the progress of the processing.

The H control unit 221C includes the H counter 221a and the H shift register 221c. The H counter 221a is reset by a horizontal synchronization signal Hsync and incremented by a pixel clock signal CLK. The H shift register 221c stores data of an initial value affecting the H counter 211a reset by the horizontal synchronization signal Hsync when the conversion processing for the horizontal shifting is performed.

The H control unit 221C sets the read addresses of the line memories selected by the V control unit 211C in the vertical conversion unit 204VC, as described above, based on the count value of the H counter 221a. Further, the H control unit 221C sets a coefficient (weight coefficient) by which each of the pixel signals transmitted from the pixel delay circuits 222-1 to 222-M should be multiplied to the H digital filter 223.

The H digital filter 223 multiplies each of the pixel signals read from the pixel delay circuits 222-1 to 222-M by the set coefficient and totals the pixel signals, and externally transmits a pixel signal obtained through the above-described processing. The above-described signal externally transmitted from the H digital filter 223 becomes the processed left-eye image signal SL'.

The operations of the resolution conversion unit 204LC shown in FIG. 27 are equivalent to those of the resolution conversion units 204LA and 204LB that are shown in FIGS. 17 and 22. Namely, the operations of the vertical resolution conversion processing, the vertical bow-like distortion correction processing, and the vertical size adjustment processing that are performed by the vertical conversion unit 204VC, and the horizontal resolution conversion processing performed by the horizontal conversion unit 204HA are equal to the operations of the resolution conversion unit 204LA shown in FIG. 17 described above. Further, the operations of the vertical shifting processing performed by the vertical conversion unit 204VC and the horizontal shifting processing performed by the horizontal conversion unit 204HC are equal to the operations of the resolution conversion unit 204LB shown in FIG. 22 described above.

According to the above-described embodiment, the projector 200 performs the vertical-and-horizontal size adjustment processing, the vertical bow-like distortion correction processing, the horizontal and/or vertical shifting processing, and so forth through the resolution conversion unit 204. However, part of and/or the entire processing may be performed through a processing unit different from the resolution conversion unit 204.

In the above-described embodiment, the resolution conversion unit 204 of the projector 200 performs one of the vertical size adjustment processing and the horizontal size adjustment processing. However, the resolution conversion unit 204 may be configured to perform both the vertical size adjustment processing and the horizontal size adjustment processing. In that case, displacement occurring due to the difference between the aspect ratios of the left-eye image PL and the right-eye image PR can be corrected only by performing the conversion processing through the resolution conversion unit 204 without performing the operation for equalizing the horizontal sizes and/or the vertical sizes through the optical zoom.

The present application contains subject matter related to that disclosed in Japanese Priority Patent Application JP 2008-299262 filed in the Japan Patent Office on Nov. 25, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image signal processing apparatus comprising:
    a first conversion processing unit configured to perform conversion processing for a left-eye image signal used to display a left-eye image on a curved screen so as to adjust a horizontal and/or vertical size of the left-eye image and to correct a vertical bow-like distortion of the left-eye image other than displacement occurring due to horizontal shifting and vertical shifting;
    a second conversion processing unit configured to perform conversion processing for a right-eye image signal used to display a right-eye image on the curved screen so as to adjust a horizontal and/or vertical size of the right-eye image and to correct a vertical bow-like distortion of the right-eye image other than displacement occurring due to horizontal shifting and vertical shifting; and
    a merging unit configured to obtain an output image signal by merging a left-eye image signal obtained by performing the conversion processing through the first conversion processing unit and a right-eye image signal obtained by performing the conversion processing through the second conversion processing unit.

2. The image signal processing apparatus according to claim 1,
    wherein the first conversion processing unit further performs conversion processing so as to shift the left-eye image in a horizontal direction and a vertical direction; and
    wherein the second conversion processing unit further performs conversion processing so as to shift the right-eye image in a horizontal direction and a vertical direction.

3. The image signal processing apparatus according to claim 2, wherein each of the first conversion processing unit and the second conversion processing unit includes:
    a vertical conversion unit configured to perform conversion processing so as to perform shifting in the vertical direction for an input image signal; and
    a horizontal conversion unit configured to perform conversion processing so as to perform shifting in the horizontal direction for an image signal obtained through the vertical conversion unit.

4. The image signal processing apparatus according to claim 2,
    wherein the first conversion processing unit and the second conversion processing unit operate in synchronization with each other,
    wherein when one of the first conversion processing unit and the second conversion processing unit performs conversion processing so as to shift an image in one direction, the other of the first conversion processing unit and the second conversion processing unit performs conversion processing so as to shift the image in a direction which is a reverse of the one direction.

5. The image signal processing apparatus according to claim 1, wherein each of the first conversion processing unit and the second conversion processing unit includes:
    a vertical conversion unit configured to perform conversion processing so as to correct the vertical bow-like distortion for an input image signal; and
    a horizontal conversion unit configured to perform conversion processing so as to adjust the horizontal size for an image signal obtained through the vertical conversion unit.

6. The image signal processing apparatus according to claim 1, wherein each of the first conversion processing unit and the second conversion processing unit includes:
    a vertical conversion unit configured to perform conversion processing so as to adjust the vertical size and correct the vertical bow-like distortion for an input image signal.

7. The image signal processing apparatus according to claim 1,
    wherein the first conversion processing unit and the second conversion processing unit operate in synchronization with each other,
    wherein when one of the first conversion processing unit and the second conversion processing unit performs conversion processing so as to increase a horizontal and/or vertical size of an image, the other of the first conversion processing unit and the second conversion processing unit performs conversion processing so as to decrease the horizontal and/or vertical size of the image, and
    wherein when one of the first conversion processing unit and the second conversion processing unit performs conversion processing so as to correct one of an upwardly convex vertical bow-like distortion and a downwardly convex vertical bow-like distortion that occur in an image, the other of the first conversion processing unit and the second conversion processing unit performs conversion processing so as to correct the other of the upwardly convex vertical bow-like distortion and the downwardly convex vertical bow-like distortion that occur in the image.

8. An image signal processing method comprising the steps of:
    performing first conversion processing for a left-eye image signal used to display a left-eye image on a curved screen so as to adjust a horizontal and/or vertical size of the left-eye image and to correct a vertical bow-like distortion of the left-eye image other than displacement occurring due to horizontal shifting and vertical shifting;
    performing second conversion processing for a right-eye image signal used to display a right-eye image on the curved screen so as to adjust a horizontal and/or vertical size of the right-eye image and to correct a vertical how-like distortion of the right-eye image other than displacement occurring due to horizontal shifting and vertical shifting; and
    obtaining an output image signal by merging a left-eye image signal obtained by performing the first conversion processing and a right-eye image signal obtained by performing the second conversion processing.

9. An image projection apparatus comprising:
    an image display unit configured to align a left-eye image and a right-eye image, in a vertical direction, on a display panel for display; and
    a projection optical system configured to downwardly project the left-eye image and the right-eye image that are displayed on the display panel onto a screen so that the left-eye image and the right-eye image on the display panel are superimposed on each other on the screen, wherein the image display unit includes
- a first conversion processing unit configured to perform conversion processing for a left-eye image signal used to display the left-eye image so as to adjust a horizontal and/or vertical size of the left-eye image and to correct a vertical bow-like distortion of the left-eye image other than displacement occurring due to horizontal shifting and vertical shifting,
- a second conversion processing unit configured to perform conversion processing for a right-eye image signal used to display the right-eye image so as to adjust a horizontal and/or vertical size of the right-eye image and to correct a vertical bow-like distortion of the right-eye image other than displacement occurring due to horizontal shifting and vertical shifting, and
- a merging unit configured to obtain an output image signal by merging a left-eye image signal obtained by performing the conversion processing through the first conversion processing unit and a right-eye image signal obtained by performing the conversion processing through the second conversion processing unit.

10. The image projection apparatus according to claim 9, wherein the projection optical system includes:
- a relay lens configured to form a real image of the left-eye image and a real image of the right-eye image that are separated from each other when a light beam reflected from the left-eye image displayed on the display panel and a light beam reflected from the right-eye image displayed on the display panel are made incident;
- a light guide unit configured to separately guide the formed real image of the left-eye image and the formed real image of the right-eye image;
- a first projection lens configured to project the guided real image of the left-eye image onto the screen; and
- a second projection lens configured to project the guided real image of the right-eye image onto the screen.

* * * * *